United States Patent
Tarricone et al.

(10) Patent No.: US 10,063,461 B2
(45) Date of Patent: *Aug. 28, 2018

(54) SYSTEM AND METHOD FOR CLIENT COMMUNICATION IN A DISTRIBUTED TELEPHONY NETWORK

(71) Applicant: Twilio, Inc., San Francisco, CA (US)

(72) Inventors: Brian Tarricone, San Francisco, CA (US); Edward Kim, San Francisco, CA (US); Ameya Lokare, San Francisco, CA (US); Jonas Borjesson, San Francisco, CA (US)

(73) Assignee: TWILIO, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/376,087

(22) Filed: Dec. 12, 2016

(65) Prior Publication Data

US 2017/0093688 A1    Mar. 30, 2017

Related U.S. Application Data

(63) Continuation of application No. 14/539,877, filed on Nov. 12, 2014, now Pat. No. 9,553,799.

(Continued)

(51) Int. Cl.
*H04L 12/725* (2013.01)
*H04L 12/733* (2013.01)
(Continued)

(52) U.S. Cl.
CPC ........ *H04L 45/126* (2013.01); *H04L 45/3065* (2013.01); *H04L 65/102* (2013.01);
(Continued)

(58) Field of Classification Search
CPC .............. H04L 45/126; H04L 45/3065; H04L 65/1006; H04L 65/102; H04L 67/104; H04L 65/105; H04L 65/1069
(Continued)

(56) References Cited

U.S. PATENT DOCUMENTS

| | | |
|---|---|---|
| 5,274,700 A | 12/1993 | Gechter et al. |
| 5,526,416 A | 6/1996 | Dezonno et al. |

(Continued)

FOREIGN PATENT DOCUMENTS

| | | |
|---|---|---|
| DE | 1684587 A | 3/1971 |
| EP | 0282126 A | 9/1988 |

(Continued)

OTHER PUBLICATIONS

"Ethernet to Token ring Bridge"—Black Box Corporation, Oct. 1999 http://blackboxcanada.com/resourcefiles/productdetails/17044.pdf.

(Continued)

*Primary Examiner* — Mark Rinehart
*Assistant Examiner* — Natali N Pascual Peguero
(74) *Attorney, Agent, or Firm* — Schwegman Lundberg & Woessner, P.A.

(57) ABSTRACT

A system and method for regional routing of internet protocol based real-time communication that includes registering a set of client application endpoint routes, comprising registering at least a first client gateway route of a first endpoint in a first region; receiving a communication invitation of the first endpoint; processing a set of communication instructions associated with the communication invitation and identifying a set of communication resources and at least a second endpoint; querying the client application endpoint routes and identifying a client gateway route of the second endpoint; and dynamically directing signaling path (Continued)

and media path of the communication according to the regional availability of the communication resources, the client gateway route of the first endpoint, and client gateway instance route of the second endpoint.

18 Claims, 30 Drawing Sheets

Related U.S. Application Data

(60) Provisional application No. 61/902,995, filed on Nov. 12, 2013.

(51) Int. Cl.
  *H04L 29/06* (2006.01)
  *H04L 29/08* (2006.01)

(52) U.S. Cl.
  CPC ........ *H04L 65/1006* (2013.01); *H04L 67/104* (2013.01); *H04L 65/105* (2013.01); *H04L 65/1069* (2013.01)

(58) Field of Classification Search
  USPC ........................................ 370/351, 352, 356
  See application file for complete search history.

(56) References Cited

U.S. PATENT DOCUMENTS

| | | |
|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Stroem et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,058,042 B2 | 6/2006 | Bontempi et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Rasanen |
| 7,245,611 B2 | 7/2007 | Narasimhan et al. |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,286,521 B1 | 10/2007 | Jackson et al. |
| 7,287,248 B1 | 10/2007 | Adeeb |
| 7,289,453 B2 | 10/2007 | Riedel et al. |

(56) References Cited

U.S. PATENT DOCUMENTS

| | | |
|---|---|---|
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soederstroem et al. |
| 8,103,725 B2 | 1/2012 | Gupta et al. |
| 8,126,128 B1 | 2/2012 | Hicks, III et al. |
| 8,126,129 B1 | 2/2012 | McGuire |
| 8,130,750 B2 | 3/2012 | Hester |
| 8,139,730 B2 | 3/2012 | Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,306,021 B2 | 11/2012 | Lawson et al. |
| 8,315,198 B2 | 11/2012 | Corneille et al. |
| 8,315,620 B1 | 11/2012 | Williamson |
| 8,319,816 B1 | 11/2012 | Swanson et al. |
| 8,326,805 B1 | 12/2012 | Arous et al. |
| 8,346,630 B1 | 1/2013 | McKeown |
| 8,355,394 B2 | 1/2013 | Taylor et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien et al. |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,509,068 B2 | 8/2013 | Begall et al. |
| 8,532,686 B2 | 9/2013 | Schmidt et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,695,077 B1 | 4/2014 | Gerhard et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,806,024 B1 | 8/2014 | Francis et al. |
| 8,819,133 B2 | 8/2014 | Wang |
| 8,825,746 B2 | 9/2014 | Ravichandran |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock |
| 8,861,510 B1 | 10/2014 | Fritz |
| 8,879,547 B2 | 11/2014 | Maes |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |

(56) References Cited

U.S. PATENT DOCUMENTS

| | | |
|---|---|---|
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,071,677 B2 | 6/2015 | Aggarwal et al. |
| 9,137,127 B2 | 9/2015 | Nowack |
| 9,141,682 B1 | 9/2015 | Adoc, Jr. et al. |
| 9,161,296 B2 | 10/2015 | Parsons |
| 9,204,281 B2 | 12/2015 | Ramprasad |
| 9,306,982 B2 | 4/2016 | Lawson et al. |
| 9,307,094 B2 | 4/2016 | Nowack et al. |
| 9,325,624 B2 | 4/2016 | Malatack |
| 9,338,190 B2 | 5/2016 | Eng et al. |
| 9,344,573 B2 | 5/2016 | Wolthuis |
| 9,378,337 B2 | 6/2016 | Kuhr |
| 9,456,008 B2 | 9/2016 | Lawson et al. |
| 9,456,339 B1 | 9/2016 | Hildner et al. |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong |
| 2002/0165957 A1 | 11/2002 | Devoe et al. |
| 2002/0176378 A1 | 11/2002 | Hamilton et al. |
| 2002/0176404 A1 | 11/2002 | Girard |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-Nogueiro et al. |
| 2003/0162506 A1 | 8/2003 | Toshimitsu et al. |
| 2003/0195950 A1 | 10/2003 | Huang et al. |
| 2003/0195990 A1 | 10/2003 | Greenblat |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Martino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matena et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishier |
| 2005/0091336 A1 | 4/2005 | DeHamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslaysky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0286496 A1 | 12/2005 | Malhotra |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0047709 A1* | 3/2007 | Brunson ............ H04M 3/42391 379/142.01 |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps |

(56) References Cited

U.S. PATENT DOCUMENTS

| | | |
|---|---|---|
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Holimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling |
| 2008/0162482 A1 | 7/2008 | Ahem et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Pumadi et al. |
| 2008/0313318 A1 | 12/2008 | Vermeulen |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0037287 A1 | 2/2009 | Baitalmal et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0092674 A1 | 4/2009 | Schwartz |
| 2009/0093250 A1 | 4/2009 | Jackson et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0262725 A1 | 10/2009 | Chen |
| 2009/0276771 A1 | 11/2009 | Nickolov et al. |
| 2009/0288012 A1 | 11/2009 | Udo et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0037064 A1 | 4/2010 | Lawson et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari |
| 2010/0217982 A1 | 8/2010 | Brown et al. |
| 2010/0232594 A1 | 9/2010 | Lawson |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |

(56) References Cited

U.S. PATENT DOCUMENTS

| | | |
|---|---|---|
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma |
| 2011/0143714 A1 | 6/2011 | Keast |
| 2011/0145049 A1 | 6/2011 | Udo et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276892 A1 | 11/2011 | Jensen-Home et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | VanSwol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau |
| 2012/0174095 A1 | 7/2012 | Natchadalingam et al. |
| 2012/0179646 A1 | 7/2012 | Hinton |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein |
| 2012/0198004 A1 | 8/2012 | Waite |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0266258 A1 | 10/2012 | Tuchman |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook |
| 2013/0036476 A1 | 2/2013 | Roever et al. |
| 2013/0047232 A1 | 2/2013 | Tuchman et al. |
| 2013/0054517 A1 | 2/2013 | Beechuk |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0109412 A1* | 5/2013 | Nguyen ............ G06Q 30/0207 455/456.3 |
| 2013/0110658 A1 | 5/2013 | Lyman et al. |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0025503 A1 | 1/2014 | Meyer et al. |
| 2014/0058806 A1 | 2/2014 | Guenette et al. |
| 2014/0064467 A1 | 3/2014 | Lawson |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0101149 A1 | 4/2014 | Winters |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm |
| 2014/0355600 A1 | 12/2014 | Lawson |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2014/0379931 A1* | 12/2014 | Gaviria ............ H04L 65/1016 709/227 |
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2015/0381580 A1 | 12/2015 | Graham, II |

(56) References Cited

U.S. PATENT DOCUMENTS

| | | |
|---|---|---|
| 2016/0011758 A1 | 1/2016 | Dornbush et al. |
| 2016/0028695 A1 | 1/2016 | Binder |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0234391 A1 | 8/2016 | Wolthuis |
| 2016/0239770 A1 | 8/2016 | Batabyal et al. |
| 2017/0339283 A1 | 11/2017 | Chaudhary et al. |

FOREIGN PATENT DOCUMENTS

| | | |
|---|---|---|
| EP | 1464418 A | 10/2004 |
| EP | 1522922 A2 | 4/2005 |
| EP | 1770586 A1 | 4/2007 |
| EP | 2053869 A1 | 4/2009 |
| ES | 2134107 A | 9/1999 |
| JP | 10294788 | 4/1998 |
| JP | 2004166000 A | 6/2004 |
| JP | 2004220118 A | 8/2004 |
| JP | 2006319914 A | 11/2006 |
| WO | 9732448 A | 9/1997 |
| WO | 2002087804 | 11/2002 |
| WO | 2006037492 A | 4/2006 |
| WO | 018489 | 2/2009 |
| WO | 2009124223 A | 10/2009 |
| WO | 2010037064 | 4/2010 |
| WO | 2010040010 A | 4/2010 |
| WO | 2010101935 A | 9/2010 |
| WO | 2011091085 A | 7/2011 |

OTHER PUBLICATIONS

Abu-Lebdeh et al. "A 3GPP Evolved Packet Core-Based Architecture for QoS-Enabled Mobile Video Surveillance Applications". 2012 Third International Conference on the Network of the Future (NOF). Nov. 21-23, 2012. pp. 1-6.

Archive Microsoft Office 365 Email | Retain Unified Archiving, 2015, GWAVA, Inc., Montreal, Canada.

Complaint for Patent Infringement, *Telinit Technologies, LLC* v. *Twilio Inc.*, dated Oct. 12, 2012.

Kim et al. "In-service Feedback QoE Framework" 2010 Third International Conference on Communication Theory. Reliability and Quality of Service. pp. 135-138. 2010.

Matos et al. "Quality of Experience-based Routing in Multi-Service Wireless Mesh Networks" Realizing Advanced Video Optimized Wireless Networks. IEEE pp. 7060-7065. 2012.

NPL, "API Monetization Platform", 2013.

RFC 3986: Uniform Resource Identifier (URI): Generic Syntax; T. Berners-Lee, R. Fielding, L. Masinter; Jan. 2005; The Internet Society.

S. barakovic and L. Skorin-Kapov. "Survey and Challenges of QoE Management Issues in Wireless Networks". 2012, pp. 1-29.

Subramanya, et al. "Digital Signatures", IEEE Potentials, Mar./Apr. 2006, pp. 5-8.

Tran et al. "User to User adaptive routing based on QoE" ICNS 2011: The Seventh International Conference on Networking and Services. pp. 170-177. 2011.

Twilio Cloud Communications—APIs for Voice, VoIP, and Text Messaging, Twilio.

Wu et al. "Quality Evaluation in Peer-to-Peer IPTV Services" Data Traffic and Monitoring Analysis, LNCS 7754. pp. 302-319. 2013.

\* cited by examiner

SYSTEM AND METHOD FOR CLIENT COMMUNICATION IN A DISTRIBUTED TELEPHONY NETWORK

CROSS-REFERENCE TO RELATED APPLICATIONS

This application is a continuation of U.S. patent application Ser. No. 14/539,877, filed 12 Nov. 2014, which claims the benefit of U.S. Provisional Application Ser. No. 61/902,995, filed on 12 Nov. 2013, both of which are incorporated in their entirety by this reference.

TECHNICAL FIELD

This invention relates generally to the telephony field, and more specifically to a new and useful system and method for client communication in a distributed telephony network.

BACKGROUND

In recent years, innovations in the web application and Voice over Internet Protocol (VOIP) have brought about considerable changes to the capabilities offered through traditional phone services. In some distributed or cloud-based telephony systems, the routing of audio, video, or other media files can be determined or limited by the location and/or availability of the appropriate computing resources. In some instances, some or all of the callers reside in the same region, country, or continent as the bulk of the computing resources, thereby promoting increased call quality. However, if one or more of the parties to the call is located in a different region, country, or continent, then it is not readily apparent which computing resources should be utilized. Similarly, if the platform infrastructure is based in one region, communication outside of that region will be poor quality. For example, if the two callers reside in different countries, it might be unclear which of many computing resources should be allocated to the particular session. Furthermore, as more communication platforms are supported by cloud computing services located in distinct areas, core-computing infrastructure may be limited to particular locations. Accordingly, there is a need in the art for determining the shortest, highest quality, and/or optimized route for session traffic in a globally distributed telephony system. This invention provides such a new and useful system and method, described in detail below with reference to the appended figures.

DESCRIPTION OF THE PREFERRED EMBODIMENTS

The following description of preferred embodiments of the invention is not intended to limit the invention to these preferred embodiments, but rather to enable any person skilled in the art to make and use this invention.

Preferred System

Figure 1:
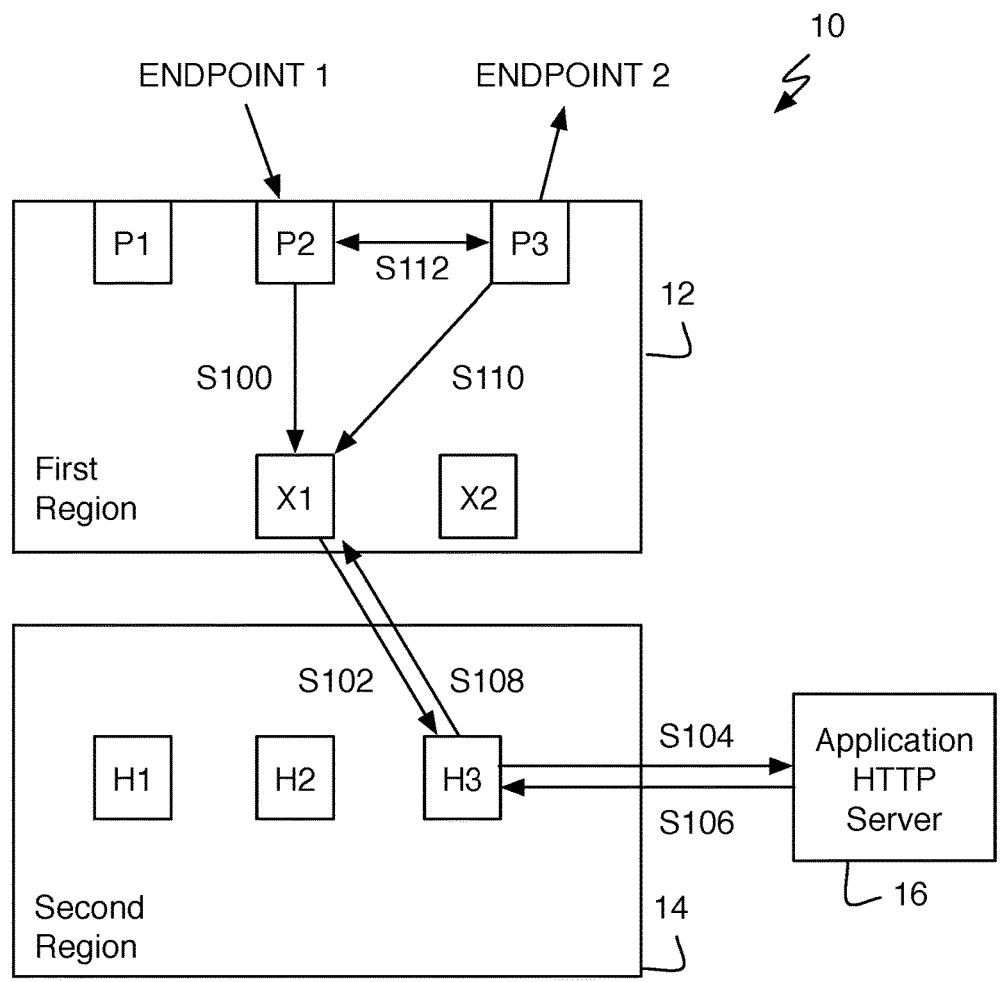
FIG. 1 is a schematic block diagram of a system and method for managing latency in a distributed telephony network in accordance with a preferred embodiment of the present invention.

As shown in FIG. 1, a system 10 of the preferred embodiment is configured for managing a distributed communication network operation in at least two regions 12, 14. The preferred system 10 can be used with any suitable cloud-computing environment, such as the one described in patent application Ser. No. 12/417,630 filed 2 Apr. 2009, entitled "System and Method for Processing Telephony Sessions", which is incorporated in its entirety by this reference. The system 10 preferably functions to provide the highest quality path for communication between two endpoints in response to one or both of a selected media type and/or the location/configuration of the endpoints of the communications. As an example, the preferred system 10 can function to minimize network latency between different types of endpoints (mobile, PSTN, browser-based telephony, client mobile devices, client browsers) using different types of media (voice, video, text, screen-sharing, multimedia) and disposed in different regions, countries, or continents. In one preferred embodiment, the system 10 is configured for managing a distributed telephony network, but may alternatively be configured for mobile/browser client communication networks, video communication, screen-sharing communication, synchronous media communication, or any suitable communication network. In operation, the preferred system can perform routing and latency minimization in response to one or more of: the features/capabilities of the endpoints; a media quality measurement (video and audio recording); codec availability/compatibility; media resource availability; and/or any suitable metric. During operation, the communication flow of the system 10 will preferably shift between operations modes—a first mode comprising communication flow between an endpoint of a local region to a remote region with more resources and a second mode comprising communication flow within the local region. Communication flow is preferably a media data stream that is used in the substantially real-time communication of media or multimedia. An exemplary benefit of the system 10 is that complex, stateful, or expensive communication resources may be maintained in limited regions and other resources can be implemented globally or regionally to support particular local regions. The limited communication resources may be complex because they maintain considerable state information of the platform, and replicating the state information regionally/globally would result in increased complexity and cost. Communication platforms, which may be susceptible to global/regional scaling issues due to the real-time nature of synchronous communication, can use the system to dynamically switch between communicating within a local region and communicating with resources of a remote region.

As shown in FIG. 1, the preferred system 10 is operable in at least two regions 12, 14, which are connectable through and/or serviced by a communication-processing server 16. The preferred system 10 can also include one or more provider services (P1, P2, P3, PN) and one or more gateways (X1, X2, XN) in the first region 12 and one or more communication-processing servers (H1, H2, H3, HN) in the second region 14. The preferred system functions to maintain functional communication when the first region 12 and second region 14 are spatially separated by a globally significant transmission distance. A globally significant distance in this document may be understood to be a transmission distance greater than 2000 miles and more preferably greater than 5000 miles. For example, the first region 12 may be on the West coast of the US and the second region 14 may be on the East coast, separated by a geographic distance greater than 2500 miles. In another example, the first region 12 may be in the United States and the second region may be in Europe, separated by a distance greater than 3500 miles. The first region 12 and the second region 14 are not limited to functioning with such distance ranges and may be separated by a distance less than 2000 miles or exceeding 5000 miles.

The provider services (P1, P2, P3) preferably receive or initiate communication to an endpoint such as a caller, a mobile or browser client. The provider service is preferably an interface between the communication platform of the system 10 and communication providers. Communication providers preferably include telephony carrier networks, client applications using IP based communication protocols, or any suitable outside network. The system 10 may include a plurality of regions in addition to the first and second regions 12, 14. The provider services are preferably specific to each region as they are determined by the communication service providers, networks, and established contracts with various communication entities.

Incoming communications to a destination endpoint are preferably routed to the provider services in response to the destination endpoint being registered with the system 10. For example, a user dialing a PSTN number belonging to the system 10 will preferably have the communication directed to a provider service (P1, P2, or P3). Another example, a user dialing a SIP based endpoint that specifies a domain registered in DNS to the system 10 will preferably have the communication directed to a provider service (P1, P2, or P3). The provider additionally creates invite requests and responses that are preferably sent to a regional address (e.g., europe.twilio.com) and resolved to a communication gateway. In some variations, communication may be directly connected to a communication gateway to achieve a lower latency audio/video. This may be particularly advantageous to mobile and browser clients. The Domain Name System (DNS), anycast, or any suitable addressing and routing methodology may be used to forward to the closest communication gateway of a particular zone. The provider services preferably use SIP protocol for communication within the system, but the outside connected communication devices may use any suitable communication protocol. Similarly, the medium of the communication can preferably include any suitable combination of possible media mediums such as audio, video, screen-sharing, or other suitable synchronous media mediums.

The communication gateways (X1, X2) are preferably configured for both media and signaling. A communication gateway preferably mediates Session Initiation Protocol (SIP) signaling between at least one endpoint of a communication, from call establishment to termination. SIP is a signaling protocol widely used for controlling communication sessions such as voice and/or video calls over Internet Protocol. Any suitable communication protocol such as RTP or combination of protocols may alternatively be used. As a SIP mediator, the communication gateway preferably creates SIP invites, issues other SIP signaling messages, and facilitates transfer of media (e.g., audio, video) between various end-points. The communication gateways (X1, X2, XN) are preferably logical network elements of a SIP application, and more preferably configured as back-to-back user agents (b2bua) for one or both of media and signaling control. A b2bua, as would be readily understood by a person of ordinary skill in the art, preferably operates between endpoints involved in a communication session (e.g., a phone call, video chat session, or screen-sharing session). The b2bua also divides a communication channel into at least two communication legs and mediates signaling between the involved endpoints from call establishment to termination. As such, the communication gateway can facilitate switching the communication flow from flowing through a remote region (to use remote resources) to flowing just within the local region (e.g., when establishing a call with another endpoint in the local region). The communication gateway may additionally include media processing components/resources such as Dual-tone Multi-frequency (DTMF) detector, media recorder, text-to-speech (TTS), and/or any suitable processor or service. The media processing and signaling components of a communication gateway may alternatively be divided into any suitable number of components or services in cooperative communication. In one variation, the communication gateway is implemented by two distinct components—a signaling gateway that handles the signaling and a media gateway that handles media processing and media communication. In an alternative embodiment, the communication gateways may be configured as a control channel that functions to allow devices to directly communicate peer-to-peer. Browser clients, mobile clients, or any suitable combination of clients may have direct media communication in this variation. This alternative embodiment is preferably used with low-latency media. As an additional security precaution, communication gateways may be configured to allow traffic from only a distinct set of providers. Other providers are preferably firewalled off to protect infrastructure from the public Internet. The communication gateways will preferably respond to communications and/or propagate the communication messages to a communication-processing server. The communication-processing server may be in a different remote region. Load balancers may additionally facilitate a communication propagating from a communication gateway to an optimal communication-processing server. For example, there may be multiple remote regions with available communication-processing servers that can service a communication. A load balancer or alternatively a routing policy engine may direct the communication to an appropriate the region and/or communication-processing server.

The communication-processing servers (H1, H2, H3) function to process communication from a communication gateway. A communication-processing server preferably provides value-added features or services to a communication. A preferred communication-processing server is preferably a call router or telephony application processing component as described in patent application Ser. No. 12/417,630 referenced and incorporated above. A communication-processing server (or more specifically a call router) will preferably retrieve an addressable application resource (e.g., HTTP URI address document) associated with the phone number or communication indicator. In a preferred embodiment, the resource is a telephony application that indicates sequential telephony commands for the communication session of the client(s). The telephony commands may include instructions to call another communication endpoint, to start a conference call, to play audio, to record audio or video, to convert text to speech, to transcribe audio, to perform answering machine detection, to send text or media messages (e.g., SMS or MMS messages), to collect DTMF key entry, to end a call, or perform any suitable action. The telephony instructions are preferably communicated in a telephony instruction markup language such as TwiML. The addressable resource is preferably hosted at the HTTP Server 16. The servers (H1, H2, H3) and HTTP server 16 communications are preferably RESTful in nature in both/all directions. RESTful is understood in this document to describe a Representational State Transfer architecture as is known in the art. The RESTful HTTP requests are preferably stateless, thus each message communicated from any component in the system 10 preferably contains all necessary information for operation and/or performance of the specified function. Signaling will preferably be transferred through the server, but media may not be transferred through the server.

The communication-processing server is preferably part of a telephony application platform and may cooperatively use several other resources in operation. The communication-processing server may be a central component to the service provided by a platform and as such may be associated with considerable stateful data generated in use of the server. The stateful data may be used in internal logic and operation of the platform and/or for providing API accessible data and information. The system 10 is preferably implemented in a multi-tenant environment where multiple accounts share/operate with the same resources. As such, there may be benefits in keeping the communication-processing servers centrally located in a limited number of regions. Since the communication-processing server may not be located in each local region, a local region may call out, bridge or otherwise communicate with a remote region that does hold a communication-processing server. As mentioned above, the communication-processing server may provide any suitable processing services in addition to or as an alternative to the call router variation described above.

As shown in FIG. 1, the preferred system 10 can route communication traffic between User 1 and User 2, wherein the communications traffic can include any suitable media type, device endpoint type, and/or network type usable in a suitable cloud-based communications system of the type described above. In an example of the preferred system's 10 operation, when User 1 wants to communicate with User 2 (a PTSN number that is part of the cloud-based system), his call is routed to provider P2. As described below, the number dialed is preferably associated with a URL or other identifier usable in the aforementioned cloud-communications system. Preferably, provider P2 creates a corresponding invite request in block 100 and sends it to a predefined server address (e.g., europe.twilio.com, us_1.twilio.com, us_2.twilio.com, etc.), which in turn resolves to communication gateway X1. Upon receipt, the communication gateway X1 preferably transmits or forwards the request to communication-processing server H3 in block S102, which as shown can be located in the second region 14. The server H3 functions to query the HTTP server 16 associated with the URL of the dialed number in block S104 to determine, receive, download, and/or capture any instructions, commands, or content associated with the dialed number. The HTTP server 16 is preferably an outside server managed by a developer or administrating entity. In a simple example, the server H3 contacts the HTTP server 16 and receives a single command (i.e., a "dial" verb) associated with the number. Other suitable commands, each of which can be referred to as a TwiML verb in the example embodiment, can include saying text to the caller, sending an SMS message, playing an audio and/or video file, getting input from the keypad, recording audio or video, connecting the call to another phone, or any other suitable type or media of communication.

As shown in FIG. 1, in block S106 the HTTP server 16 returns the TwiML to server H3, at which point the server H3 processes the TwiML to determine the particulars of the initial request, i.e., to whom the call is directed, where the other endpoint is located, what type of media is being directed to the second user, and the like. In the example embodiment shown in FIG. 1, the second user is located in the first region 12 with the first user, and therefore the server H3 returns the invite request back to communication gateway X1 for further processing in block S108. Upon receipt, the communication gateway X1 determines that the inbound request is related to the prior invite request received in block S100; and transmits the request to a predetermined provider P3 in block S110 for eventual connection of the communication to the second user from P3. Preferably, upon connection between provider P3 and the second user, the communication traffic between the first and second users will flow directly between the providers P2 and P3 in block S112 with little to no input from any other component of the preferred system 10 in the second region 14. In one variation of the preferred system 10, media files and/or functionality are stored at and/or performed by one or more of the communication gateways X1 working alone or in combination with each other or additional servers, databases, and/or controllers. As will be described in further detail below, the communication traffic may be subsequently dynamically redirected to route through the server H3. For example, one of the endpoints may hang up, and the remaining endpoint may have communication traffic flow from the endpoint of P1 to X1 to H3 and back during the execution of other communication instructions.

Figure 2:
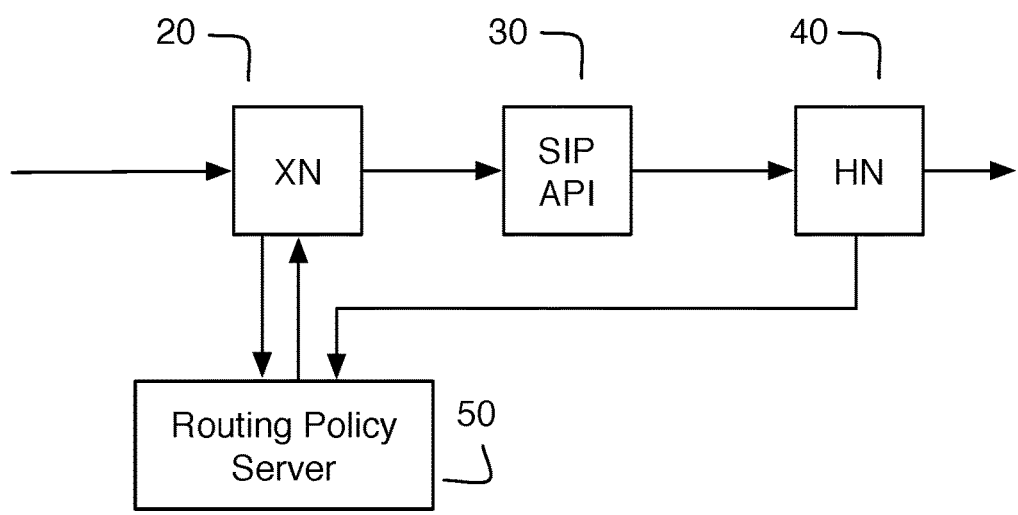
FIG. 2 is a schematic block diagram of a variation of the preferred system and method for managing latency in a telephony network.

As shown in FIG. 2, one variation of the preferred system 10 can additionally include a routing policy server 50 in communication with the communication gateway XN 20 and/or a communication-processing server H3, and further include a SIP API 30 in communication with both the communication gateway 20 and server HN 40. In one example configuration of the preferred system 10, the communication gateway 20 functions in part as a back-to-back user agent (b2bua) for one or both of media and signaling control. As an example, the communication gateway 20 can be configured to handle multiple types of re-invite scenarios and to transfer audio, video, or other media between various communicating endpoints. Preferably, the communication gateway 20 can be configured to record audio or video streams and/or play any suitable type of media file (e.g., addressed to a URL). In other configurations of the preferred system 10, the communication gateway 20 can be configured as a real-time transport protocol (RTP) hub for handling RTP communications, RTP events, and/or generating/consuming RTPC sender and receiver reports. As described below, the RTPC reports can be transmitted and/or made available to the policy server 50 such that the policy server 50 has real-time or near real-time information about the quality of different traffic routes in the larger system 10. The quality reports and the routing policy server 50 can additionally work in cooperation with a best quality routing (BQR) routing approach. In another variation of the preferred system 10, the communication gateway 20 can be configured as a single component/unit that handles both media and signaling processes. Alternatively, the communication gateway 20 can be configured as two distinct components (media and signaling) residing on one or more nodes in the larger system 10 environment or in any other suitable configuration or deployment in a distributed network.

As shown in FIG. 2, the present variation of the preferred system 10 can include a routing policy server 50 in communication with the communication-processing server and/or the communication gateway 20. The routing policy server 50 preferably functions to optimize the flow of traffic throughout the preferred system 10 by selecting and/or aiding in selecting the best available communication gateway 20 (X1, X2, XN) and/or communication-processing server (H1, H2) for routing the network traffic. Preferably, the routing policy server 50 optimizes traffic flow in response to one or both of the types/number/location of the endpoints (browser, VOIP, PSTN, mobile/cellular) and the type of media (voice, video, text, multimedia) used in each communication. As shown in FIG. 2, the routing policy server 50 preferably receives input/s from each of the communication gateways 20, for example in the form of RTCP sender and receiver reports, which enables the routing policy server 50 to determine in real time or near real time the current status of each of the communication gateways 20, and in turn to select the optimal communication gateway 20 for any present network session. Preferably, one or both of the communication gateway 20 and/or the server 40 can query the routing policy server 50 for the optimal route, which can be determined in response to one or more inputs received/requested from the communication gateway 20. Additionally or alternatively, the routing policy server 50 can receive from each communication gateway 20 a live quality of service report from which the policy server 50 can determine the current optimal route for any pending sessions. In another variation of the preferred system 10, the routing policy server 50 can apply a universal or generic routing protocol between nodes without consideration of the type of media being enjoyed in the communication session. In use, the preferred policy server 50 can function to prevent overloading of any particular node, server, or route in the preferred system 10 by continuously and substantially simultaneously selecting and/or aiding in the selection of the optimally configured communication gateway 20 and/or server 50 for each pending session.

Figure 18:
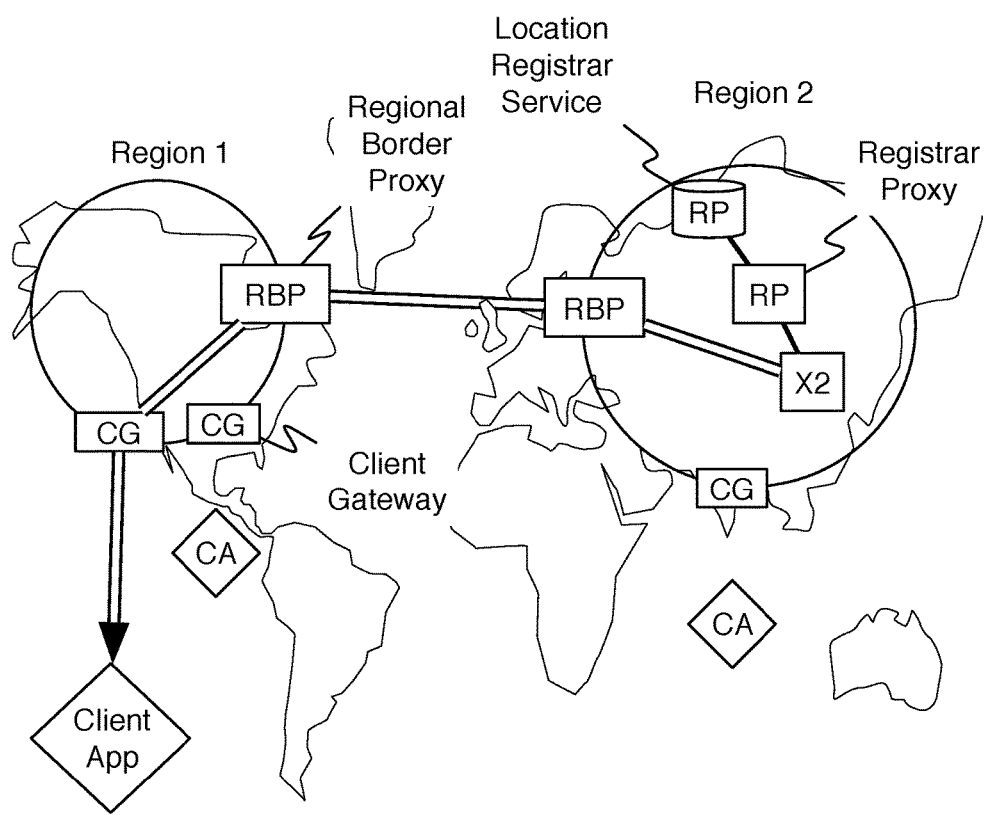
FIG. 18 is a schematic representation of a system with a media channel established between a client application and a second region.

Additionally or alternatively, the system can include a registrar proxy and a location registrar service as shown in FIG. 18. The registrar proxy can be supplemental to the routing policy server 50, be integrated into the routing policy server 50, or used in place of the routing policy server. The registrar proxy and the location registrar service are preferably used to provide an interface to store, update, and accessing route records for different communication endpoints. The registrar proxy and the location registrar service are preferably used to store and keep updated routes for client application instances. They can additionally include phone number routing information, SIP device routing information, or any suitable form of routing information. The registrar proxy and the location registrar service preferably reside in main regions (e.g., a region that contains a communication processing server). The registrar resources can alternatively be located in any suitable region—regional border proxies can be configured with knowledge of location of the registrar resource so that the registration resources can be accessed regardless of where they are located. The registrar proxy can be a server that acts as the interface to the location registration information. The registrar proxy can additionally facilitate establishing media channels between appropriate endpoints. For example, when attempting to connect two client application in a region remote from a communication-processing server, the registrar proxy can.

As shown in FIG. 2, the present variation of the preferred system 10 can further include one or more application programming interfaces (APIs) functioning and/or exposed by one or more components in the preferred system 10. For example, a session initiation protocol (SIP) API 30 is shown in FIG. 2 for coordinating messages/communications between the communication gateway 20 and the server 40. Additionally or alternatively, the routing policy server 50 can include one or more APIs for determining the optimal route between two endpoints in the pending communication. A preferred routing policy server 50 API can be a RESTFul or any suitable alternative type of API. As noted above, in one alternative configuration the communication gateway 20 can include a media portion and a signaling portion, in which case the media portion (not shown) can include an API (such as a REST or Java API) to respond to media allocation requests from the signaling portion (not shown) of the communication gateway 20. In operation, a suitable communication gateway 20 API can expose one or more functionalities (i.e., allocation of a media resource with the following capabilities) and then return a resource identifier, IP address, and/or port to where the media should be directed.

The SIP API 30 can include one or more additional headers and/or configurations for use in the preferred system 10, including a regional header, an action header, a features header, a support header, and/or a required header. In this example implementation, the regional header can indicate a zone from which the request is originating, including for example a regional or sub-regional zone of Europe, Asia, North America, and/or South America. The example action header can include instructions for the receiver to perform one or more designated actions, such as a "hang up" action. The example features header can include one or more system 10 specific features, such as an instruction to hang up if the user presses the star key on his or her terminal, whether the hardware supports call recording, and the like. The example support/required headers can include information that identify any features, protocols, functions, and/or other features that are desirable, optional, or necessary for properly routing the session through any particular set of communication gateways 20 and servers 40.

Figure 19:
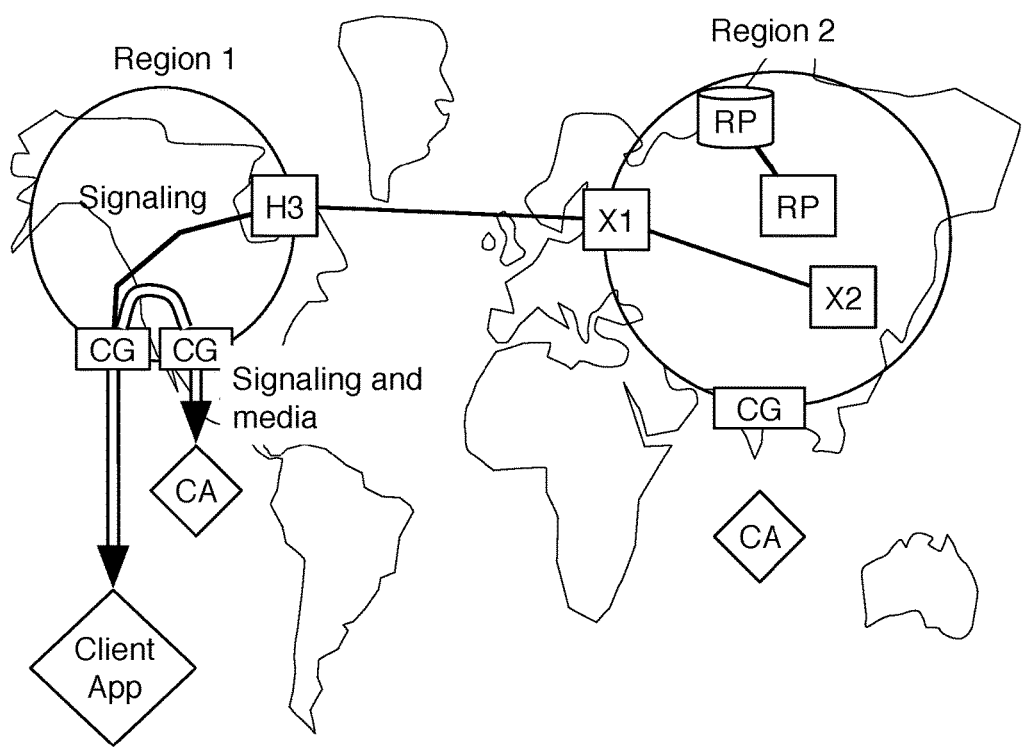
FIG. 19 is a schematic representation of a system with a media channel established between two client applications outside of the second region.

As shown in FIG. 19, the system can additionally or alternatively include client gateways and regional border proxies in supported regions, which function to support use of client application instances as communication endpoints. Client application instances additionally can rely on a registrar proxy and a location registrar service as described above. A client application is preferably defined as an IP connected communication device that is leveraging web-based real-time communication protocol. The client gateway is used to service media and signaling channels with the client application instances. The client gateways additionally translate client application communication protocols to those of the communication platform. In one implementation, SIP is used internally within the communication platform, and the client gateway translates between browser or application based communication to SIP. When communicating between client applications in the same region, a media channel is preferably established between the two client applications through the client gateways. As latency can be less sensitive to latency, the signaling channel can be maintained with a region with higher level functionality services (e.g., the communication-processing server). The regional border proxies preferably provide the media and signaling gateway between different regions. The regional border proxies can be configured to know the main regions and the route information to their respective regional border proxy.

The system preferably can be configured to perform one or more of the foregoing functions in a computer-readable medium storing computer-readable instructions. The instructions are preferably executed by computer-executable components preferably integrated with the one or more communication gateways (X1, X2, XN) in the first region 12, the one or more communication-processing servers (H1, H2, H3, HN) in the second region 14, the HTTP server 16, the SIP API 30, and/or the routing policy server 50. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but the instructions can alternatively or additionally be executed by any suitable dedicated hardware device.

Preferred Methods

Figure 3:
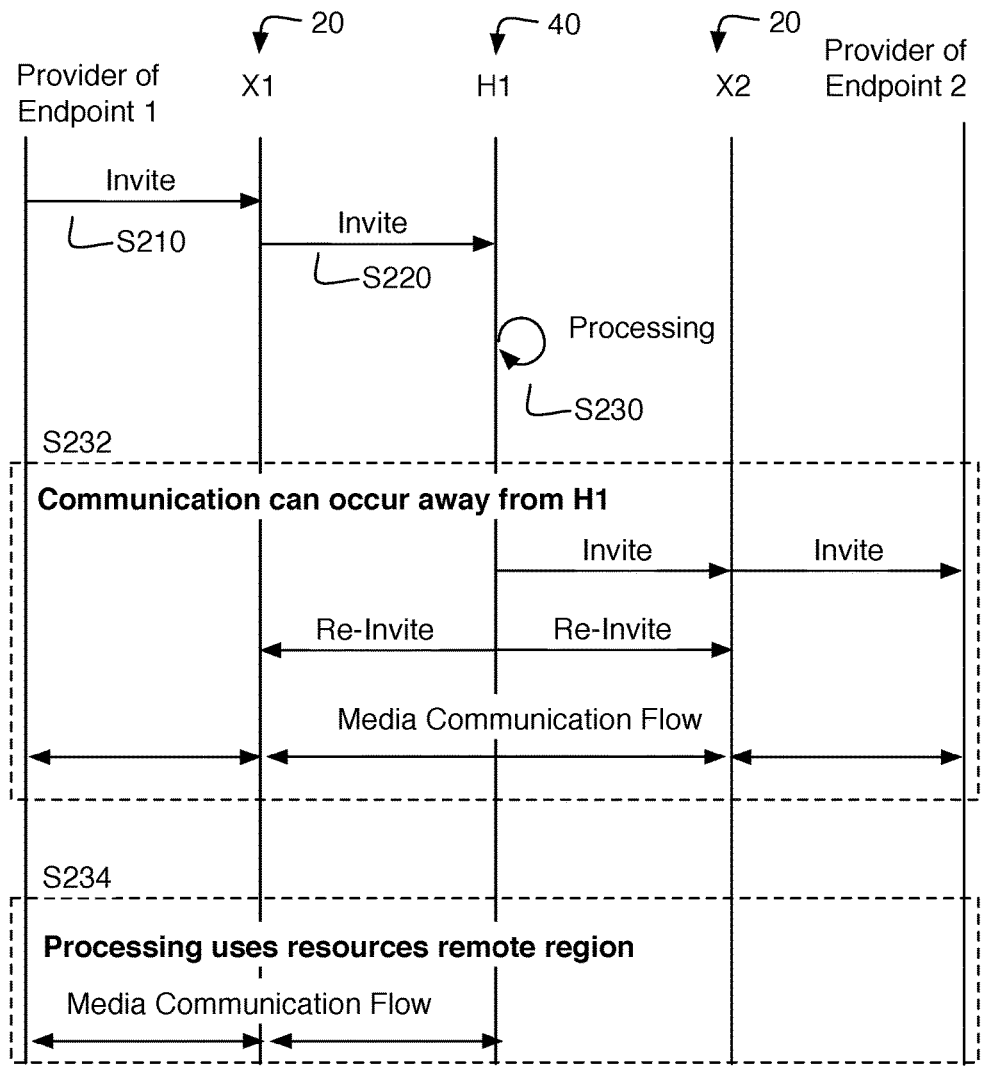
FIG. 3 is a communication flow diagram of an example implementation of the preferred method for managing latency in a telephony network.
Figure 4A:
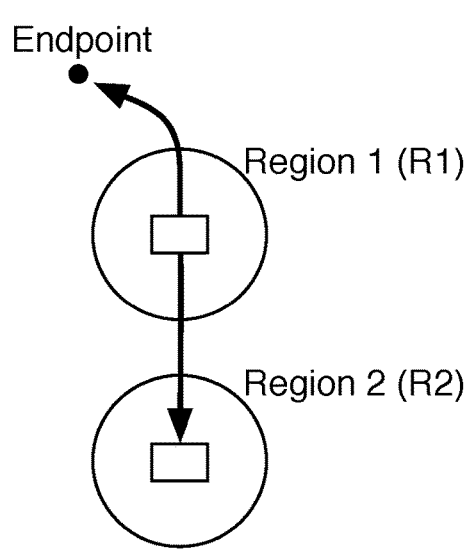
FIGS. 4A-4D are exemplary schematic representations of communication flow between a first and second region.
Figure 4B:
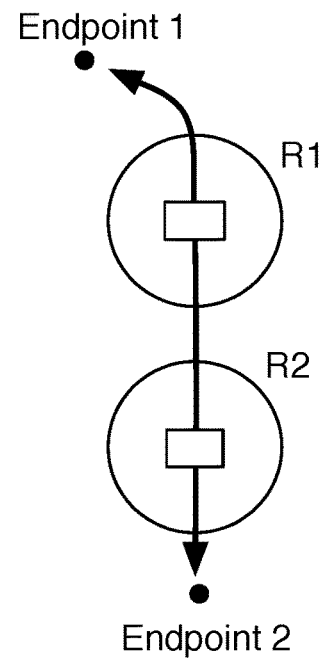
Figure 4C:
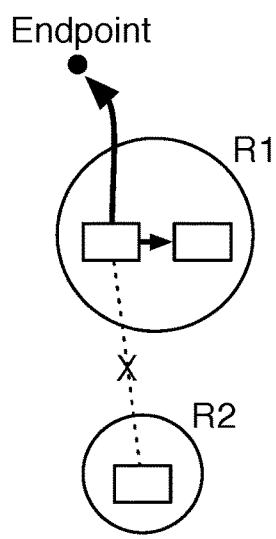
Figure 4D:
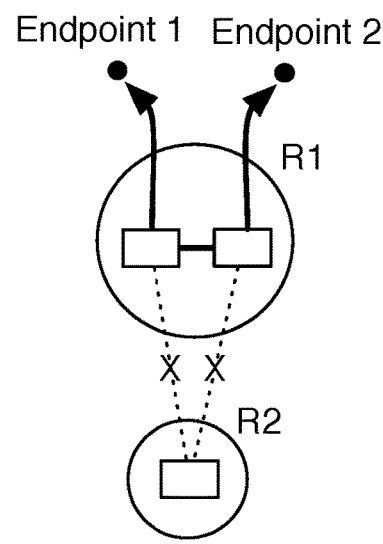

As shown in FIG. 3, a method of the preferred embodiment can include receiving a communication invitation of a first endpoint from a communication provider S210, signaling the communication invitation to a communication-processing server in a second region S220, dynamically directing signaling and media of the communication according to communication processing instructions and the resources available in at least the first and second regions S230 that includes selectively routing media communication exclusively through communication resources of the first region if media resources to execute the processing instructions are available in the first region S232 and selectively routing media communication through at least the communication-processing server if media resources are not in the first region S234. The system functions to dynamically redirect traffic for signaling and media. The method is preferably employed in a regionally/globally distributed communication platform that works with communication susceptible to latency performance issues. The method is preferably used within a communication processing platform such as the telephony platform incorporated by reference above. The method may additionally or alternatively be used with video communication, client based audio communication (e.g., VoIP), screen-sharing applications, and/or any suitable communication platform. Replicating all components in different regions can be expensive and increase complexity of a system. The method enables components to be intelligently and progressively rolled out to new regions (or be statically implemented) without fully replicating the system needed to support the features of a platform—some components may be available in one region and some in others. Preferably, a geographically distributed communication computing platform will include a subset of resources in a first region and a subset of resources in a second region. The subsets of resources are preferably not identical sets (in terms of the function of the components). A local region (used to service particular geographic regions) is preferably a limited sub-set of a remote region (used to provide core platform functionality). Preferably lightweight and ancillary services and components (e.g., signaling and standalone media processing services) are deployed in various regions to support local communication endpoints, and more core or complex resources (e.g., ones that maintain state within the platform) are deployed in a limited number of regions, which are often remotely located from the local regions. The method is preferably used to implement communication instruction processing with a communication stream between the first and second region as shown in FIGS. 4A and 4B, and when a media communication stream can flow exclusively through the first region, dynamically establishing the communication flow to not flow through intermediary media resources of the second region, but instead to use media resources of the first region as shown in FIGS. 4C and 4D.

Block S210, which includes receiving a communication invitation of a first endpoint from a communication provider, functions to initiate a communication session. Preferably a "call" will be directed to the system through a provider service of the first region. The called destination is preferably registered with the system. For example, the telephony endpoint (the phone number, phone number prefix, SIP address, the domain of the SIP address, and the like) is used to route communication to the system in any suitable manner. The provider services preferably ports or provides a network access interface through which outside communication networks connect to the system (and/or conversely, how the system connects to the outside communication networks). A communication will preferably include a call from an endpoint being directed through outside networking to a provider service interface. The provider service will preferably use SIP signaling or any suitable protocol to direct a communication stream to a communication gateway of the first region. A SIP communication invite is preferably received at the communication gateway or more specifically a SIP signaling gateway acting as a b2bua. Herein, "calls" may refer to PSTN phone calls, IP based video calls, screen-sharing sessions, multimedia sessions, and/or any suitable synchronous media communication. Calls can additionally be mixed medium/protocols. For example, a call (i.e., communication session) may have one leg connect to a PSTN telephony device while a second leg connects to a Sip based client application. Calls may alternatively be initiated from within the system such as in response to an API request or any suitable event.

Figure 7:
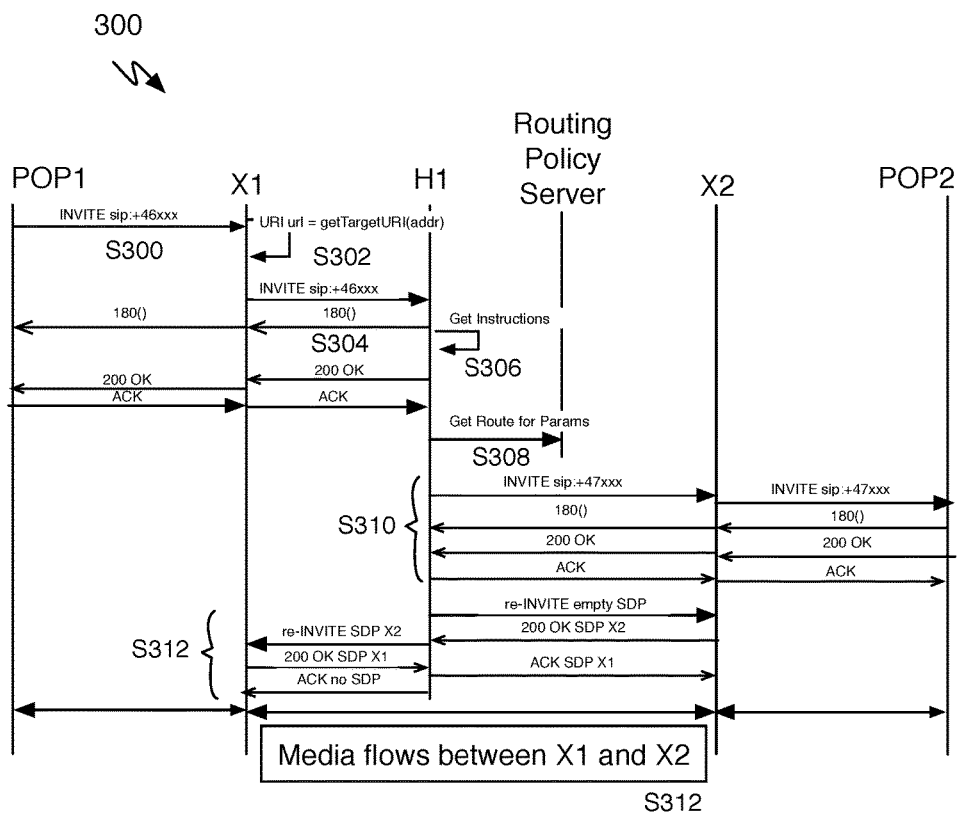
FIG. 7 is an exemplary communication flow diagram of an implementation for a call between two PSTN devices of the method of the preferred embodiment.

Block S220, which includes signaling the communication invitation to a communication-processing server in a second region, functions to direct the communication to a communication-processing server in another region. The other region (the second region) is preferably spatially separate and remotely located from the first region. The distance of separation is preferably a globally significant distance. Within the US, the distance may be greater than 2000 miles (across country). Across the globe, the distance may be greater than 5000 miles. The communication gateway preferably directs the communication signaling. As shown in FIG. 7, the communication invitation is preferably a SIP invite but may alternatively be a communication invitation of any suitable protocol. The communication gateway may additionally query a routing policy engine prior to transmitting the communication invitation. The routing policy server will preferably determine an appropriate routing of the call. Preferably the routing policy server will identify the appropriate communication-processing server in the second region. Additionally, the routing policy server may consider communication-processing servers in a plurality of regions (possibly including the first region). In another variation, the routing policy server may detect that the resources for processing the particular call can be handled within the first region and direct that call appropriately within the first region. For example, a particular phone number may not be configured for telephony application processing and simply redirect to another endpoint accessible through the first region. In this example, the communication gateway may forego accessing a call router in a second region, and establish media communication flow between the first and second endpoint using resources of the first region.

The communication-processing server can provide any suitable communication processing service. Preferably, the communication-processing server acts as a call router that manages execution of a communication session application. Processing a communication application can include operations such as connecting to endpoints, recording media, processing media (converting text-to-speech, transcribing audio to text, transcoding between media codecs), retrieving device inputs (e.g., DTMF capture), sending messages or emails, ending calls, providing answering machine detection, or providing any suitable service. In one preferred variation, the method may additionally include, within the second region, a communication-processing server retrieving application instructions from an internet accessible server at a URI that is associated with a destination endpoint of the communication invitation. In this variation, the communication-processing server is preferably a call router as described in the incorporated patent application Ser. No. 12/417,630. The application instructions are preferably formatted as markup instructions within a document retrieved over HTTP using a web request-response model.

Block S230, which includes dynamically directing signaling and media of the communication according to communication processing instructions and the resources available in at least the first and second regions functions to redirect communication to appropriate regions. The directing of signaling and media is preferably dynamically responsive to the active state of the communication. Preferably, the signal and media direction is responsive to application state of a communication. Application state may include streaming media between two outside endpoints, playing media from the system to an endpoint, processing or recording media of a communication, or any suitable application state. The communication routing is preferably changed to increase the communication performance of the current state of a communication. For example, if a first endpoint is connected to a second endpoint, and the first and second endpoints are in the same region, the communication media stream is preferably kept within the first region. This can preferably reduce the amount of communication latency that might be involved in routing through a second region. In a contrasting situation, if the communication of a first endpoint necessitates particular media processing not available in the first region, a communication flow may be established with a second region. Additionally, an application can be configured with any suitable logic. For example, a call may be responsive to a new connection to an endpoint, to one of two endpoints hanging up, to initiating media processing (e.g., audio recording, transcription, or DTMF detection), or to sending an out of stream communication (e.g., SMS or MMS) and the like.

Block S232, which includes selectively routing media communication exclusively through communication resources of the first region if media resources to execute the processing instructions are available in the first region, functions to route communication within a region. The resources of the region are preferably sufficient to support the current state of the communication session. In a preferred variation, the media communication is exclusively routed through the communication resource of the first region for calls to other endpoints in the region. Block S132 preferably includes a communication-processing server inviting a second gateway, the second communication gateway inviting a second endpoint accessible through a provider service of the first region, and the communication-processing server re-inviting the first and second communication gateways to establish media communication flow between the first and second endpoints. The communication is also directed away from the communication-processing server of the second region. As a slight variation, the media communication flow may even be established to flow directly between the first and second endpoints without passing through a gateway of the first region. The first and second endpoints can be PSTN-based endpoints, SIP based endpoints, RTP based endpoints, and/or any suitable endpoint. An endpoint is preferably any addressable communication destination, which may be a phone, a client application (e.g., desktop or mobile application), an IP based device or any suitable communication device. The endpoints can use any suitable protocol and the first and second endpoints may additionally use different communication protocols or mediums.

Additionally or alternatively, routing media communication exclusively through communication resources of the first region may include selecting a media resource of the first region to facilitate the media communication flow. In some cases, select media resources may be deployed/implemented in the first region. When the current communication media stream transitions to a state where it requires only the media resources of the first region, the media communication flow will preferably utilize the media resources of the first region, rather than those of the remotely located resources in the second region. For example, an application may initiate a media recording instruction. If a recording resource is in the first region, the communication gateway may direct communication flow to go to the local recording server as opposed to a recording server in a different region. In another example, a media transcoding server may be accessed to transcode media for two endpoints. Two endpoints may use different media codecs that are not compatible. The transcoding service will preferably be added as an intermediary in the communication flow so that the media can be transcoded with low latency.

The method may include querying a routing policy service for a selected communication route, which functions to dynamically select a communication route. The routing policy server can use the current state of the system, individual regions, individual resources/services/components of a region, application state, or any suitable parameter as an input. In one variation, the routing policy service is substantially statically defined. A set of rules and/or architecture configuration may be used to select the routes. In another variation, the routing policy service performs an analysis and selects a route that has statistical indications to be an optimal route based on the analysis. The routing policy server is preferably queried by the communication-processing server to select communication gateways. The routing policy server may additionally or alternatively be used by the communication gateway to select a communication-processing server in block S220. There may be one canonical routing policy server or multiple routing policy server instances may be established in multiple regions.

Block S234, which includes selectively routing media communication through at least the communication-processing server if media resources are not in the first region, functions to route communication between the first and second regions. This selective option is preferably taken when the resource needed or preferred for handling the communication session is not within the local region (i.e., the first region). As with the initiation of a call, the communication gateway preferably initially connects to a communication-processing server. As was mentioned above, this default behavior may not be taken if the next state of the communication is known without accessing the communication-processing server. Additional resources within the second region may additionally or alternatively be used with the communication-processing server. For example, media resources such as recording service, text-to-speech servers, transcoding servers, transcription/speech recognition servers, and/or any suitable media resource may be implemented in the second region and may act on the media communication flow.

Figure 5:
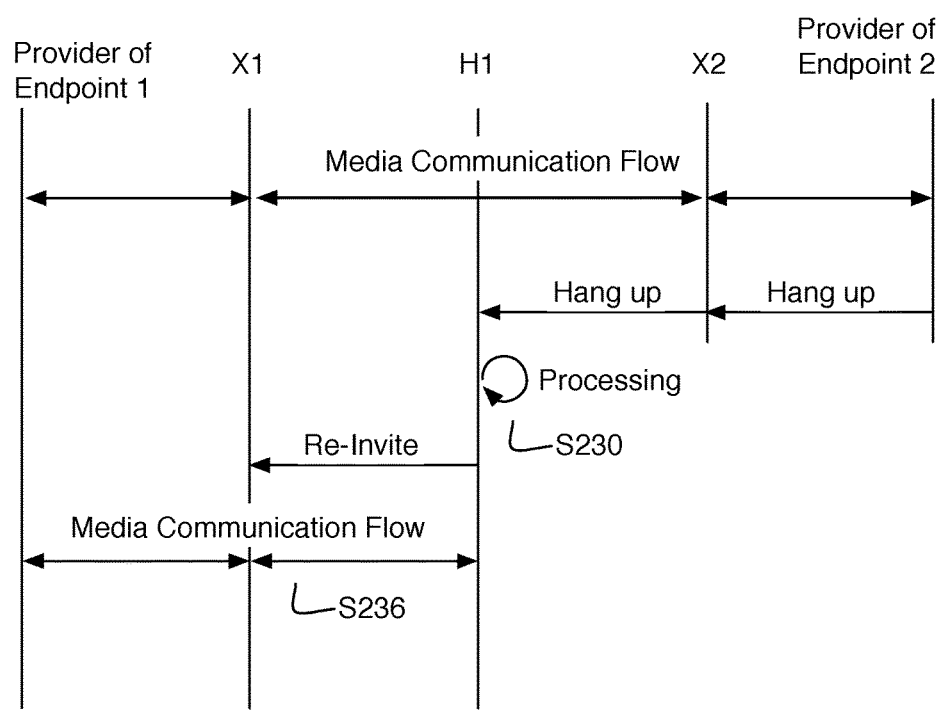
FIG. 5 is a communication flow diagram of a variation re-establishing communication of the preferred embodiment.

As mentioned above, the directing of the communication can dynamically change. The method may additionally include re-establishing communication with the communication-processing server upon a second endpoint terminating the media communication flow S236 as shown in FIG. 5. Block S236 can function to enable the communication to recover after communication flow has moved away from a resource of the second region. As mentioned, the second region preferably includes a communication-processing server that can be configured for processing application state of a communication session. Since the communication-processing server may not be in the communication flow when two endpoints are connected, a communication gateway in the first region will preferably re-invite a communication-processing server and reestablish communication flow between the first endpoint and the communication-processing server. For example, two callers may be talking in a first region. When the callee hangs up, the first caller may be connected to a call router in a second region that can play text to speech audio or perform any suitable application action. The communication flow can be redirected any number of times.

Figure 6:
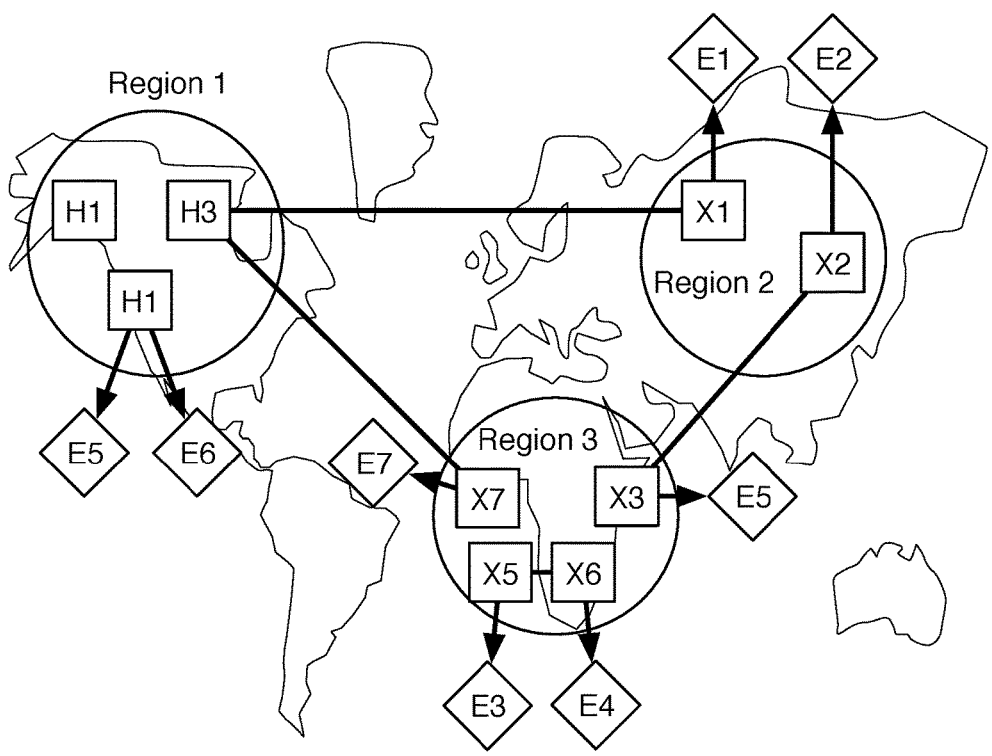
FIG. 6 is an exemplary representation of the system and method of the preferred embodiment implemented within various regions.

As shown in FIG. 6, the method may additionally be expanded such that communication flow may be directed between any suitable number of regions. In an exemplary implementation, there may be at least two base regions in the US, with globally diversified local regions such as one in Europe, one in Asia, and one in South America. These regions may dynamically route communication based on an optimal or preferred route. The preferred route may be based on substantially static configuration of the different regions (e.g., how many resources are in each region), but may alternatively be based on quality metrics such as latency, quality of service reports, or any suitable metrics.

In an alternative embodiment, a method of a preferred embodiment can additionally or alternatively utilize regional communication gateways to achieve global low latency platform operation.

Example Implementations

As shown in FIG. 7, one example implementation of the system and/or method of the preferred embodiment can include a telephone call between a pair of PSTN telephone users. Those of skill in the art will readily appreciate that the following description is of an exemplary setting of the system and/or method of the preferred embodiment and does not limit the claimed invention to any particular aspect or feature described below. As shown in method 300 in FIG. 7, block S300 can include receiving a call invitation at a first communication gateway X1 from a first user's POP (point of presence provider or in other words a provider server). As noted above, FIG. 7 illustrates a single use case in which the desired communication is between two PSTN users. Accordingly, the content of block S300 can include an invitation for a voice call identifying both the media (voice) as well as the desired endpoint (phone number to which the call is directed).

In block S302, the first communication gateway preferably performs any necessary authentications, security checks, verifications, and/or credential checks for one or both of the caller and the recipient. Block S302 can additionally include looking up and/or identifying a target uniform resource identifier (URI) for the invitation, which designates the next destination for the transmission, i.e., the suitable regional communication-processing server H1 for the request. As shown in FIG. 7, upon receipt of the request at the server H1, the server H1 responds to the communication gateway X1, which in turn propagates the response back to the POP (point of presence) service (e.g., the provider service) in block S304.

In block S306, the server H1 downloads and/or retrieves the TwiML based on the URI associated with the dialed number (which corresponds to an address in one variation of the preferred system and method). Preferably, block S306 can further include determining if there is any media associated with the session. Preferably, the existence or requirement of a particular media can be determined with reference to the TwiML, which can contain predefined actions or verbs. Suitable actions or verbs can include dialing a number, saying text to the caller, sending an SMS message, playing an audio or video file, getting input from the keypad, recording audio or video, connecting the call to another browser client or device, or any other suitable type or media of communication. In the example implementation, the TwiML would contain the "dial" verb, which requires media. Following a series of mutual acknowledgements, the transmission of media is opened up between the POP and the server H1 in block S306.

As shown in FIG. 7, the example implementation can include block s308, which includes determining an optimal route for the media at the routing policy server. Preferably, block S308 is performed substantially simultaneously with the series of acknowledgements performed in block S306. Preferably, the policy server 50 optimizes traffic flow in response to one or both of the types/number/location of the endpoints (browser, VOIP, PSTN, mobile/cellular) and the type of media (voice, video, text, multimedia) used in each communication. As noted above, the routing policy server preferably receives input/s from one or both of the communication gateways X1 or X2, for example in the form of RTCP sender and receiver reports, which enables the routing policy server to determine in real time or near real time the current status of each of the communication gateways X1 and X2, and in turn to select an optimal communication gateway X2 for the proposed call. Here optimal is used to indicate an algorithmically probable best route. As shown in FIG. 3, the server H1 requests the optimal route from the policy server in block S308. Additionally or alternatively, the routing policy server can receive from each communication gateway XN a live quality of service report from which the policy server can determine the current optimal route for any pending sessions.

As shown in FIG. 7, once the policy server determines the optimal route (i.e., a second communication gateway X2), it will return the appropriate URI to the server H1 so that the server H1 can communicate directly with the second communication gateway X2. In block S310, the example implementation can include a series of requests, invites, and acknowledgements between the server H1, the second communication gateway X2, and the second POP destination of the call recipient. Upon establishing the second leg of the communication session, block S312 can include checking the two endpoints (via first and second communication gateways X1 and X2), and then permitting media to flow between the first and second communication gateways X1 and X2 in block S314.

Preferably, the server H1 is not involved in the media flow of block S314. Accordingly, another example implementation can include detecting, at each of the first and second communication gateways X1 and X2, whether each respective side of the session has timed out for some reason. In response to a timeout at the first communication gateway X1, the first communication gateway X1 will alert the server H1, which in turn will hang up both the caller side and the callee side of the session. Alternatively, if it is the second communication gateway X2 that times out, then the server H1 can be configured to only terminate or hang up on the callee side in the event that there are more actions or verbs to execute on the caller side.

The foregoing example implementation illustrates one aspect of the preferred system and method using a single dial verb between two PSTN users in a telephony system. However, the preferred system and method can be readily configured for any suitable combination of verbs, user types, and media types found in a cloud-based communication network system. Some example alternative implementations can include usage of the say verb, the hang up verb, the gather verb, either alone or in combination with the dial verb described above.

Figure 8:
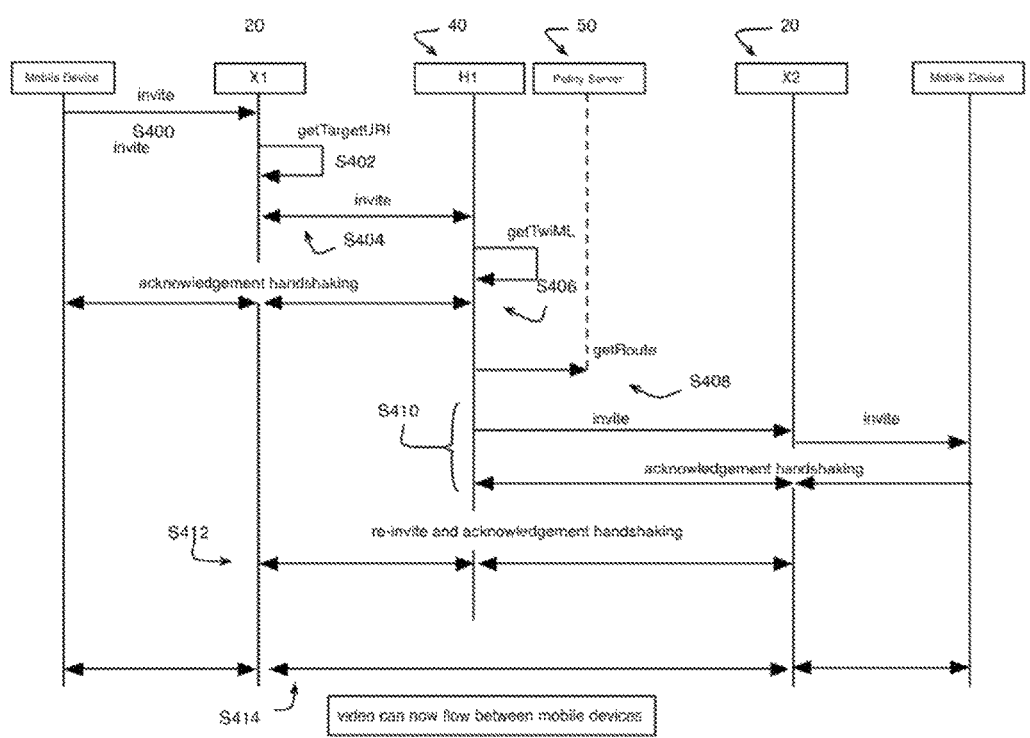
FIG. 8 is an exemplary communication flow diagram of an implementation for a call between two client devices of the method of the preferred embodiment.

As shown in FIG. 8, a second exemplary implementation of the system and/or method of the preferred embodiment can include video streaming between two mobile devices. In this example, client mobile or browser devices may connect directly to communication gateways X1 and X2. This variation functions in a substantially similar manner to the above example but may vary in communication medium/protocols and user devices. In this variation, block S400 may include receiving a video invitation at a first communication gateway X1 from a mobile device. Alternatively, a video invitation may be received at a first communication gateway X1 from a POP. Blocks S402, S404, S406, S408, S410, and S412 are substantially similar to steps S302, S304, S306, S308, S310, and S312 except in implementation differences accommodating for video streaming and direct connection of the mobile devices to the communication gateways. These blocks preferably establish two legs of a communication session such that video can flow between the first and second mobile device in block S414.

Figure 9:
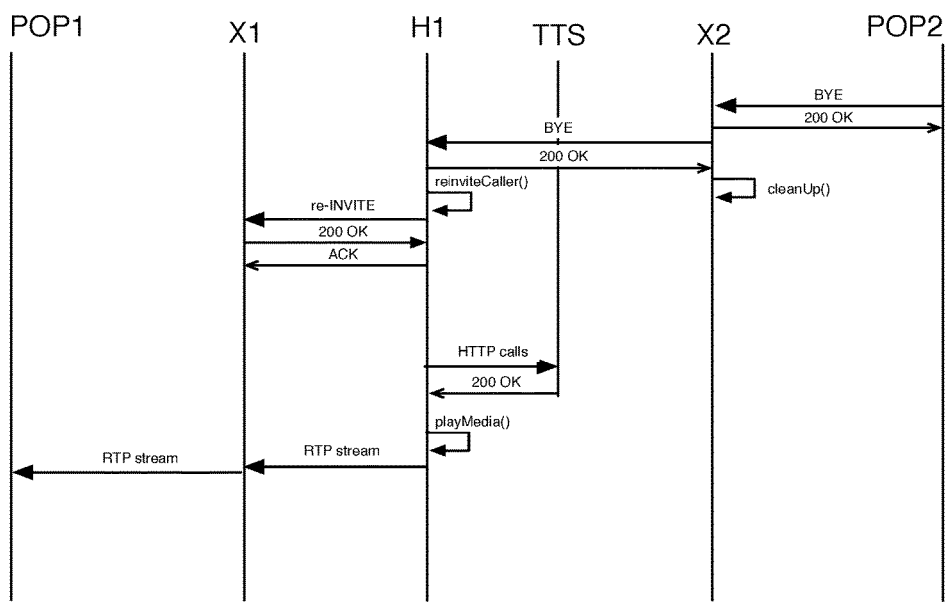
FIG. 9 is an exemplary communication flow diagram of a telephony application with dial followed by a text-to-speech instruction.

As shown in FIG. 9, a third exemplary implementation of the system and/or method of the preferred embodiment can accommodate a dial followed by a text-to-speech command. This is preferably an extension of method 300 above, where a user handing up re-invites between the communication-processing server and the communication gateway can occur multiple times throughout the lifetime of a call. A communication will preferably be initialized as described above so that media communication flows between two endpoints of a first region. One of the endpoints hangs up causing a SIP BYE signal to be sent to a second communication gateway (X2). X2 then propagates the BYE to the communication-processing server (H1) in the second region. The H1 in this scenario will evaluate the application instructions. If more instructions exist within the application, then the H1 can re-invite the first endpoint to bring media communication flow back to the H1 The H1 re-invites the first communication gateway (X1), a 200 OK reply is received, an acknowledgement signal is delivered, and media communication will once again flow between X1 and H1. In this variation, the next communication instruction is to play text-to-speech audio. The H1 will preferably call out to a TTS service to download or access the audio, and then the H1 will stream the media to the X1 and the X1 will stream the media to the first endpoint. In an alternative version, the H1 may instruct the X1 to perform the TTS operations or to use a TTS service of the first region.

Figure 10:
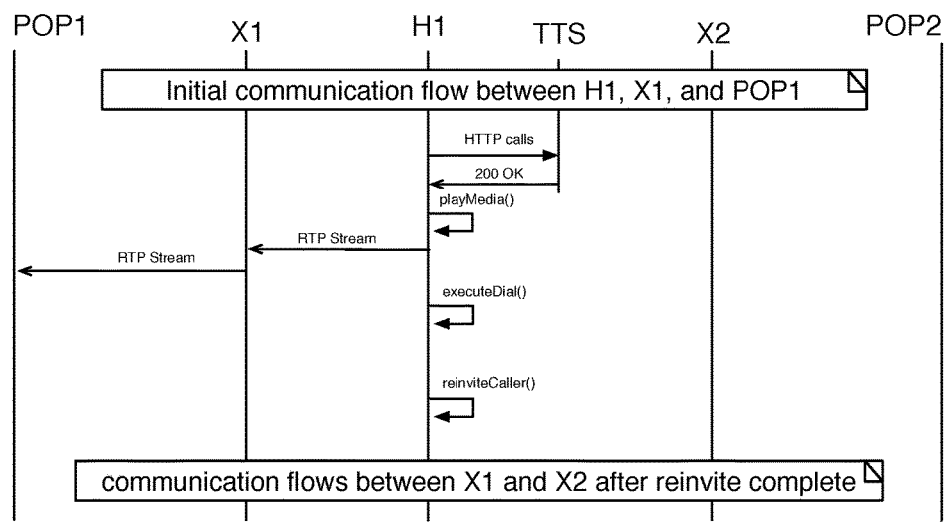
FIG. 10 is an exemplary communication flow diagram of a telephony application with a say instruction followed by a dial instruction.

As shown in FIG. 10, a fourth exemplary implementation of the system and/or method of the preferred embodiment can accommodate a say followed by a dial. A caller form a first region dials in and is invited to a H1 via a communication gateway X1 as in the initial portion of method 300. Once the call has been established, the H1 preferably downloads or accesses the communication platform with the communication instructions. In this particular example, the instructions include a say instruction followed by a dial instruction. The H1 will contact a TTS server and play the media. After the media of the ITS has completed, the H1 will preferably continue to execute the communication instructions and will thus execute the dial instruction. If the dial instruction is to an endpoint in the first region, the second endpoint will be added to the communication flow in a manner similar to that in 300.

Figure 11:
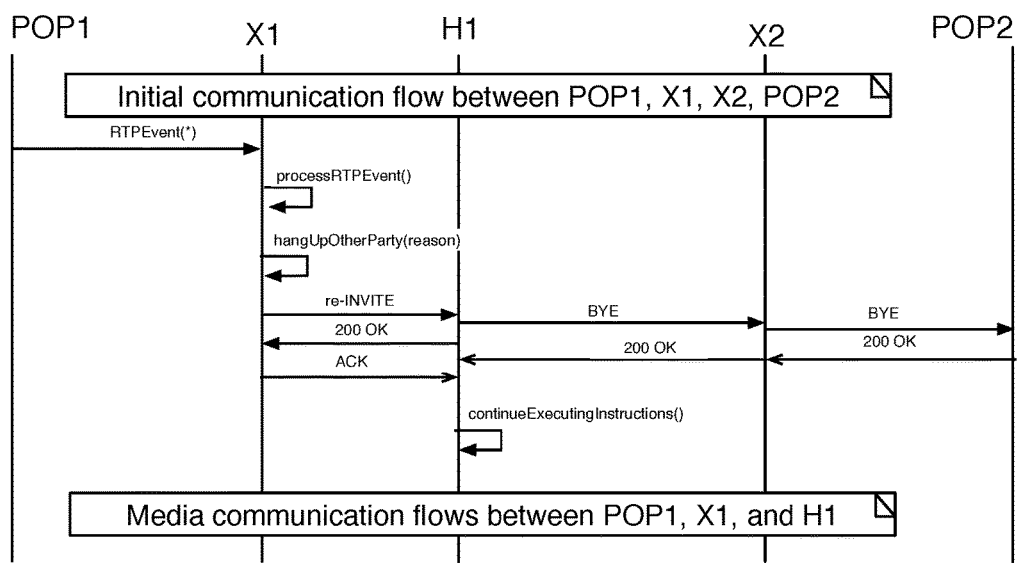
FIGS. 11 and 12 is an exemplary communication flow diagram of a telephony application hanging up a call based on detected input.
Figure 12:
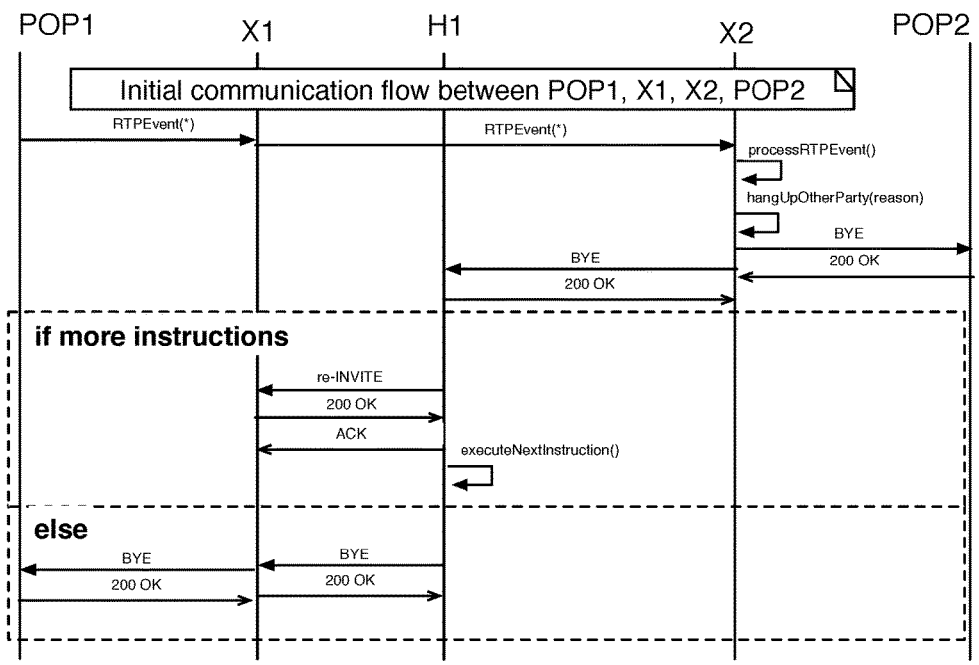

As shown in FIG. 11, a fifth exemplary implementation of the system and/or method of the preferred embodiment can accommodate hanging up a call on a detected input. In this example, the detected input will be the DTMF input of a star (*). A user presses star when they are ready to end a call. An RTP event is sent to the provider service, which is then delivered to X1. X1 will initiate a hang up of the other party. To hang up, a re-invite signal is sent to the H1 with an action header that asks the communication processing service to hang up the other side. The H1 then issues a BYE sequence to the second endpoint through the X2 and continues executing any remaining application instructions. In an alternative implementation shown in FIG. 12, X1 delivers the RTP event to X2, which initiates the hang up process. X2 signals the end of the call and ends communication with the H1. H1 will then re-invite X1 or hang up depending on the state of the communication platform.

Figure 13:
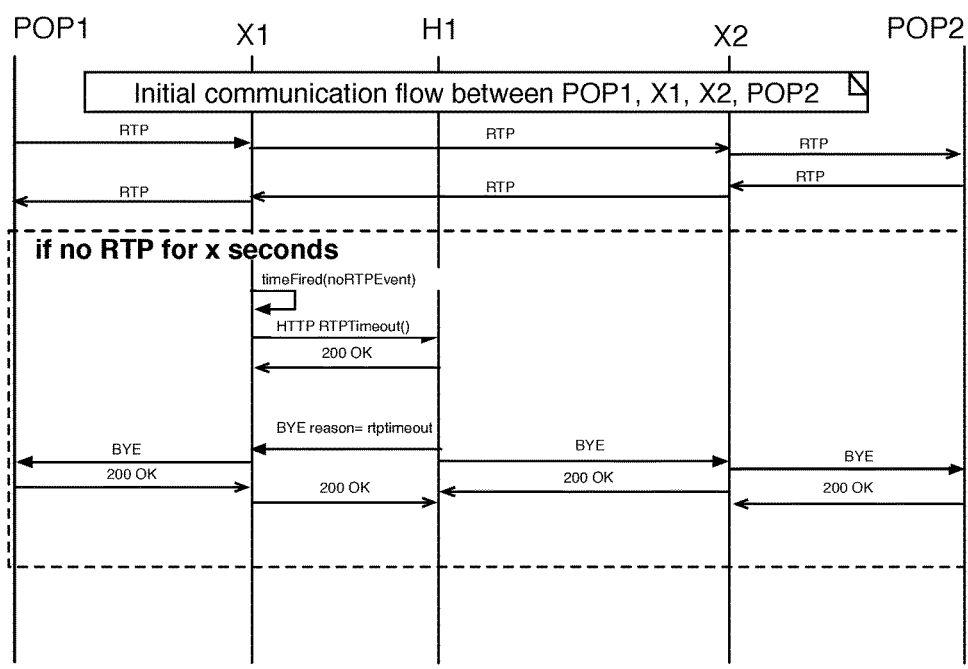
FIGS. 13 and 14 is an exemplary communication flow diagram of a caller or callee timing out.
Figure 14:
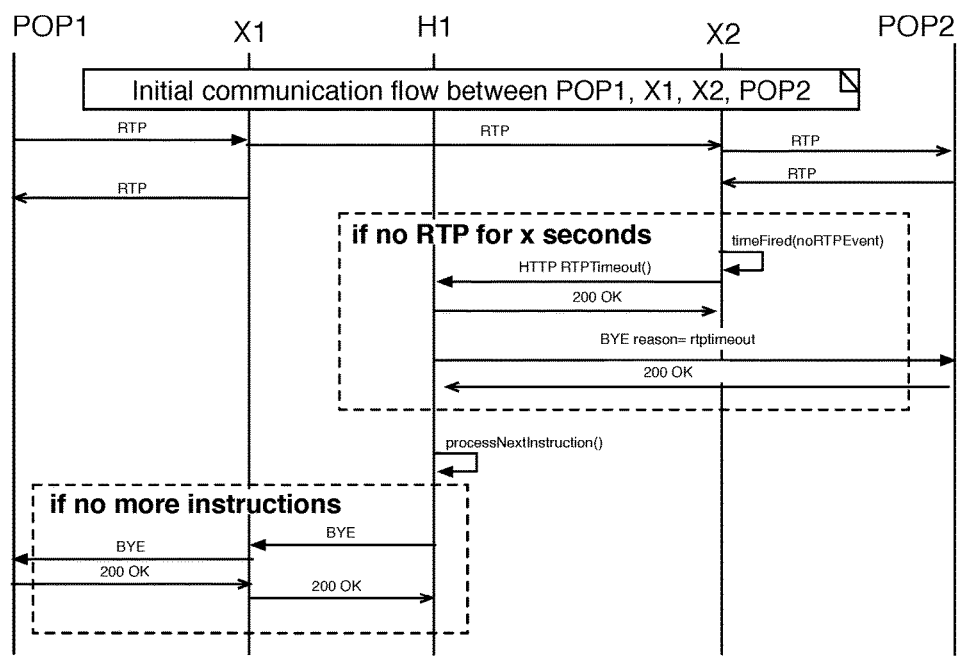

A sixth exemplary implementation of the system and/or method of the preferred embodiment can accommodate timeout scenarios on the caller or callee side. Each communication gateway is preferably responsible for detecting timeouts for their respective leg of the communication. As shown in FIG. 13, the caller side X1 may detect a timeout scenario when the caller endpoint stops sending RTP for a configurable amount of time. X1 then signals the H1 to notify that a timeout has occurred. The H1 will preferably hang up/terminate the caller side and the callee side. The BYE signal preferably includes a header that specifies the reason for the termination (e.g., an RTP timeout). As shown in FIG. 14, the callee side X2 may detect a timeout scenario when the callee endpoint stops sending RTP for a configurable amount of time. X2 signals the error to the H1 and the communication flow is terminated for the callee. As there may still be application instructions that can execute for the caller, the H1 preferably executes any remaining instructions or alternatively terminates communication with the caller.

One or more aspects of the example embodiment can be configured partially or entirely in a computer-readable medium storing computer-readable instructions. The instructions are preferably executed by computer-executable components preferably integrated with one or more APIs, servers, routing policy servers, POP servers, and/or communication gateways. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but the instructions can alternatively or additionally be executed by any suitable dedicated hardware device.

System and Method of Global Media Resources

Figure 15:
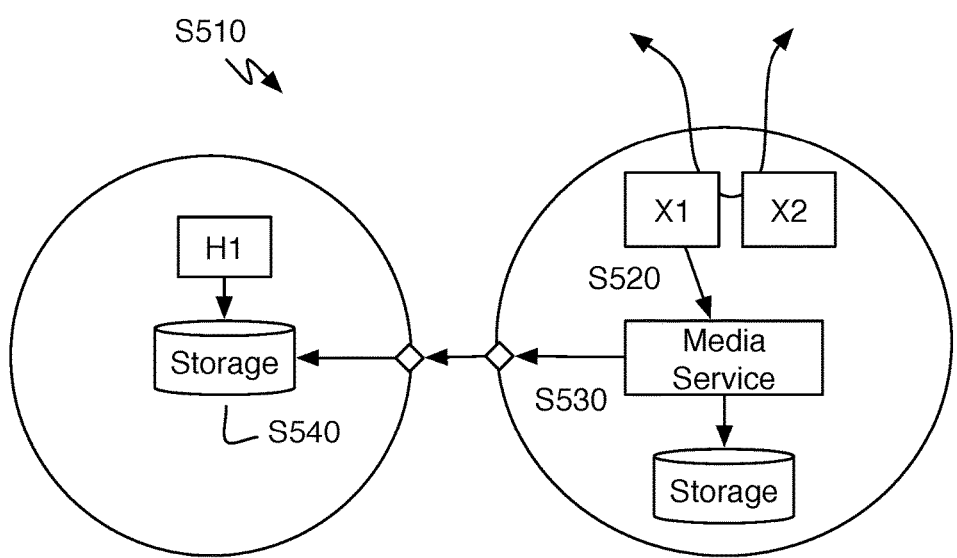
FIG. 15 is schematic representation of a system of a preferred embodiment.

As shown in FIG. 15, a system for processing communication media in a regionally distributed communication platform of a preferred embodiment functions to enable communication media services within a local region. When deploying a communication platform across geographically diverse regions, some services can benefit by having low latency interactions with real-time, synchronous communication. In addition to providing the media services with low latency, the system enables a platform to provide consistent data across the platform. This is beneficial for maintaining consistent API resources. For example, recordings generated in local regions will be available through an API. The method is preferably used in combination with the system and methods described above. The system preferably includes the elements described above for at least two regions. A first region (a local region) preferably includes a plurality of provider services, communication gateways and supplemental media services. The second region (the remote region) preferably includes at least a communication-processing server and any additional resources, services, or components. The remote region preferably includes more resources and services. For example, API resources are preferably stored and maintained in the remote region.

The system and method can be used with any suitable media resource or resources that may benefit from being deployed to local regions. The media resources are preferably configured as a media services. A media service can be easily deployed in a local region and operate independently and consistently integrate with other regions, such as the remote region where API resources and state is maintained. A media service preferably has a defined interface and manages its own high availability load balancing, scalability, redundancy, and other service oriented orchestration considerations. Storage and state can preferably be maintained internally within the media service. For example, a database used to manage the service orchestration of the media service can be kept internally and may, at least in part, not be shared outside of the service. Information, records, and data that is to be shared outside of a media service, is preferably distributed across regions for other services to consume. The media service may include a media service API to facilitate access and integration of the media service with other services and components of a communication platform. Media services are preferably composed of components or computing resources. The components can be software libraries or other services (e.g., a mini-service). The components preferably perform a specific task. Some of these components, which facilitate a particular feature of a service, may or may not be activated or included in a locally deployed media service. For example, for a recording service, transcription may or may not be an included component. Multiple media services may be implemented within a local region, and the media services may target a variety of communication functions. A media service may be a recording service, a text-to-speech (TTS) service, a speech recognition service, a transcoding service, an input detection service, answering machine detection service, a conferencing service, a communication queuing service, and/or any suitable media service.

Figure 17:
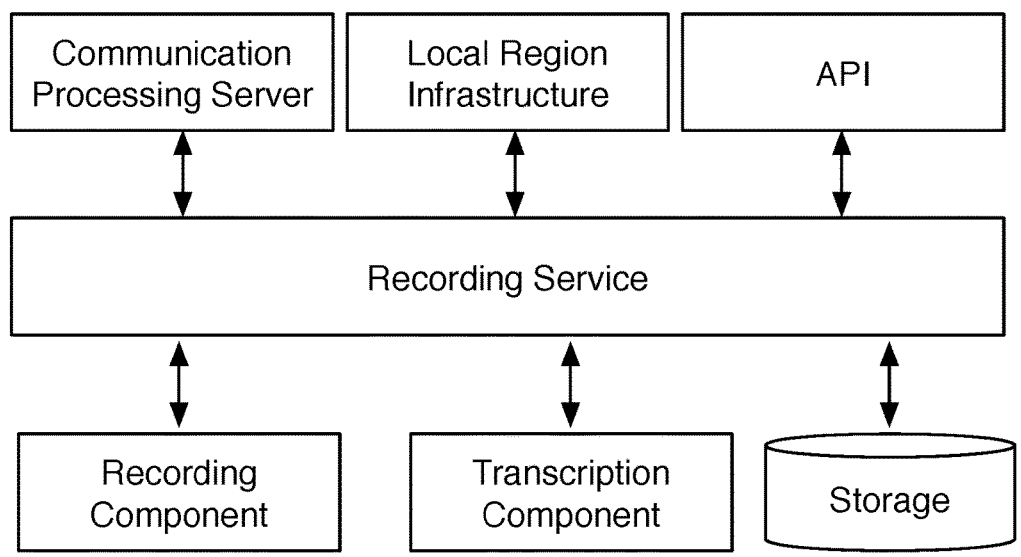
FIG. 17 is a schematic representation of components of a recording service.

Recording services preferably enable recording of calls or communication sessions that are routed through communication gateways within the local region. This avoids routing media communication flow through a remote region to access a recording resource. Recording is preferably for audio recording, but may additionally or alternatively include video recording, screen-sharing recording, multimedia recording, or any suitable recording service. The recording service may have additional features that may or may not be integrated into the recording service of the local service. Transcription is one preferred feature of the recording service. Transcription may use algorithmic speech recognition techniques, automated manual transcription, semi-automated techniques, and/or any suitable approach. The audio recording files, the meta data of the recording (e.g., timestamp, time duration, audio quality and format), and/or the recording transcripts are preferably synchronized with a remote region. As shown in FIG. 17, a recording service preferably includes a recording component, a transcription component, and at least a storage component. The recording service additionally includes communication interfaces with a communication-processing server (e.g., a call router), API, and the resources of one or ore more regions.

The recording component is preferably responsible for taking a stream (audio, video, etc.), manipulating the stream (e.g., trimming off silence, transcoding it to a different format/codec, etc.,) and writing the recording to a file. Inputs for the recording component may include the audio stream, the file name, and/or arguments for trimming, file format, recording quality, volume adjustment, and/or any suitable parameter of the recording. Outputs of the recording component preferably include an audio stream saved as a file, meta data such as the duration of the saved audio file, and size of the file. The transcription component can include inputs such as the audio stream, transcription arguments, an HTTP callback to call when transcription is complete, and/or any suitable parameter. The transcription arguments may include the accuracy level of the transcription (e.g., level of service), language of transcription, and/or any suitable variable of the transcription process. The transcription component preferably outputs the text of the stream. An interface of the recording service preferably abstracts away the innerworkings of the components of the recording service. The interface of the recording service uses inputs of a recording ID, an audio stream to record, and/or a HTTP callback to call after complete. In one variation the HTTP callback is called after transcoding of the recorded file is complete. Other inputs and parameters may additionally or alternatively be exposed of the recording service. Additional inputs may include transcription inputs such as if a recording should use transcription and the parameters of the transcription. The recording service interface preferably outputs a URI or alternative resources address of a recording, parameters of the recording (e.g., duration of the recording, timestamp), and/or file parameters such as file size.

A Text-to speech service preferably generates, plays, and/or converts text into audible speech. The audible speech is then played within a communication stream. For example, a phone call may connect to a telephony application that specifies a script that should be read to the caller. The script is preferably directed to the TTS service to be played during the phone call. The text-to-speech services are preferably for audio communication. However, a computer generated video simulation or rendering of a speaker may additionally be created for video communication. The text-to-speech service preferably takes text as an input and outputs an audio stream and/or an audio file as an output. The audio file may be cached internally within a local region implementation of a media service. The audio file of a TTS request may additionally be synchronized with a TTS cache of a remote region.

A speech recognition service is preferably a service used in collecting spoken input and converting it into a format for transcription, natural language processing, or interpretation of responses. The speech recognition may use the transcription component described above, but may alternatively use an alternative approach. The input to the speech recognition is preferably an audio stream and parameters of speech recognition. Parameters of speech recognition may include expected language of speech. In one variation, the speech recognition service is used to detect or identify categories of responses. For example, the speech recognition may be used to identify a number with a set number of digits, to identify particular key words, or classes of responses. In one example, classes of responses may include a confirmation class and a cancel/deny response. The output may be the interpretation of the speech. In one variation, an HTTP callback may be specified where the output may be posted after speech recognition is completed. In another variation, the speech recognition service may work in cooperation with the recording service. Alternatively, a speech recognition component may be integrated into the recording service, an input detection service, and/or any suitable service.

A transcoding service functions to convert between formats. The transcoding may convert an active media stream to another format. For example, a call with two endpoints may natively use two different codecs. The transcoding service may convert one or two of the legs of the communication to a common or compatible media stream format. Additionally, the transcoding service may work to convert accessed media resources that are or will be used in a communication session. For example, an MP3 file accessed from a URI may be converted to a wave file for playback during a phone call. The transcoding service preferably accepts a media stream in a first format and outputs a media stream in a second format. The transcoding preferably is used on communication that flows within the local region. The transcoding service may additionally be used if communication flows between two different local regions (as opposed to including a third remote region just for the transcoding service).

An input detection service functions to gather inputs of a communication device. Preferably the input detection service collects DTMF inputs from a user. In the DTMF input detection variation, an audio stream and parameters of detection are preferably an input to the service. Parameters of DTMF detection can include timeout, a key to finish detection on, number of digits, a callback URI to call after input is captured, and/or any suitable input. As an additional service, an answering machine detection service may be used to identify an answering machine. The components of an answering machine detection service may alternatively be integrated into the input detection service or any suitable service.

Conferencing services preferably facilitate calls with more than two endpoints connected. Various features of conference calls may be enabled through components of conferencing services. Additionally, a conferencing service may generate accessible API resources that can be used by applications to programmatically query and modify aspects of in-progress or past conference calls. The API resources are preferably streamed or transmitted to a remote region where consistent representations of API resources are managed for a platform. This preferably functions to make API resources to be regionally/globally consistent despite media services handling communication processing within a local region. For example, a conference call may be in progress in Europe. The communication is preferably routed between multiple European endpoints, possible communication gateways facilitating the signaling, and a conferencing service in the European region. Data for conference call API resources is preferably communicated back to a remote region that is used in managing the API resources. Now if an application anywhere in the world queries for the in-progress conferencing resource and modifies the resource that occurs on a platform consistent version of the API resource. The synchronous communication preferably avoids increased latency that may occur if the communication was routed to a remote region to a conferencing service, but the API resources used to programmatically interact with the conference call are maintained consistent in the platform.

A communication queuing service functions manage phone queues or, in other words, communication holding lines. Similar to the conference call above, API resources for querying and managing a call queue may be accessible within the platform. The data to support such API resources is preferably synchronized with the platform services and components in a remote region.

As mentioned above any suitable services may be implemented within a local region. The media services used within a local region depend on the use-case of the communication platform. While any of the above media services or suitable alternative media services may used, the below method primarily uses a recording service as an exemplary media service but any suitable media service may additionally or alternatively be used.

Figure 16:
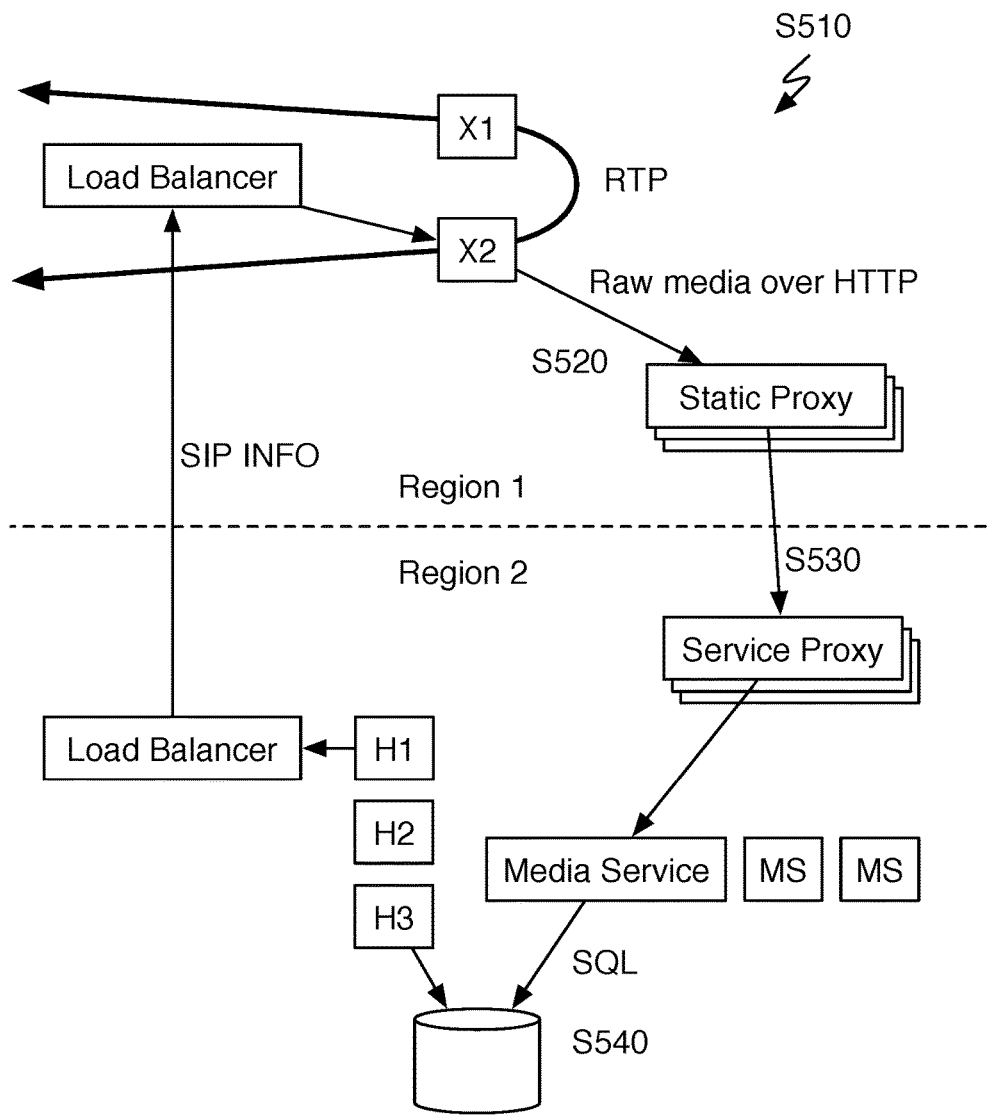
FIG. 16 is a variation of a method with static and service proxies.

As shown in FIG. 16, a service for processing communication media in a global of a preferred embodiment can include providing a communication processing platform with components of at least two regions S510, routing communication to at least one media service of the local region S520, tunneling a media stream to the remote region S530, and storing the data of the media service S540. The method functions to enable communication media services within a local region. When deploying a communication platform across geographically diverse regions, some services can benefit by having low latency interactions with real-time, synchronous communication. In addition to providing the media services with low latency, the method enables a platform to provide consistent data across the platform. This is beneficial for maintaining consistent API resources. For example, recordings generated in local regions will be available through a global API. The method is preferably used in combination with the system and methods described above.

Block S510, which includes providing a communication processing platform with components of at least two regions, functions to dynamically direct communication traffic between two regions. The provided communication processing platform is preferably substantially similar to the system and methods described above. Communication can preferably be routed within a local region if resources are available in that region or communication can be routed between at least a local and remote region to use the resources used during a communication session. Providing communication processing platform may include initializing signaling and media communication flow as described above. The subsequent steps below are preferably used in the context where the media communication flow is established within a local region. In other words, media communication flow is from at least one endpoint through a provider service of a first region and to at least a communication gateway. A one legged variation where only one outside endpoint is connected preferably uses at least one media resource to act as the other endpoint (e.g., play audio and/or collect input). Other variations, preferably involve a communication session having at least two outside endpoints connected. The communication route preferably is from a first endpoint through a provider service to a first communication gateway to a second communication gateway and then through a provider service to the second endpoint. Any suitable number of endpoints may additionally be connected. Additionally, communication is additionally routed to a media service as described below in Block S520.

Block S520, which includes routing communication to at least one media service of the local region, functions to incorporate a media service with active communication. The media service may also be provided by a remote service as well as a local region. A benefit of using the media service of the local region is that latency issues, quality of service, and other issues may be avoided by containing communication flow within a local region. A media service is preferably activated by a communication-processing server (e.g., a call router) of a remote region deciding that a media process should be used. The communication-processing server preferably signals to the communication gateway of the local region to inform the communication gateway that it should use, activate, or enable the media service. Preferably the signal is sent through a SIP control channel using SIP INFO. Additionally, some record within the remote region may initially be created by the communication-processing server. The record may be used in creation of an API resource or for internal logic of the remote region. The record is preferably stored in a database or some other suitable storage mechanism. In initializing the record, some information such as a resource ID or secure ID may be automatically generated before a media service is notified. Record information such as account information, media resource ID, and other instructions may be included in the signal communication to the communication gateway in the local region. For example, if a call router encounters an instruction to record audio. The call router preferably creates a recording resource in the remote region; transmits a SIP INFO signal to a communication gateway managing the endpoint in a remote region, wherein the SIP INFO also includes recording instructions, the resource ID and account information.

The communication gateway preferably activates the media resource by connecting the communication stream to the media service. Depending on the type and use-case of the media service, the media service may be an intermediary service, a side service or an endpoint service. As an intermediary service, the media communication flow passes through the media service. This may include a transformation of the media stream between different legs of the communication. For example, a transcoding service may convert the communication stream to a common compatible media format. A side service is preferably an ancillary service that has a communication stream pushed to the media service. The media service may be passively observing the communication stream such as in the case of a recording service. The media service may alternatively actively interact with the communication stream such as if an input service signals the communication gateway that an input event was detected. The media service may additionally be a communicating endpoint of the communication session. For example, a media service for playing audio files and/or performing speech recognition may act as one leg of a phone call. In the case of a recording service, the two streams of a media communication are preferably merged and pushed to the recording resource over HTTP. The stream is additionally stored in local disc of the local region. The local disc storage functions as a backup in case of failure. In one variation, the media service of the local region is implemented as a static proxy of the media service and the media stream is tunneled from the static proxy to a service proxy and media service of a remote region as shown in FIG. 16. A static proxy of a media service may provide temporary storage or processing capabilities. Long terms data and more complicated asynchronous processing of a media service may be kept within remote regions. The static proxy preferably runs a server mode tunnel service (e.g., stunnel) and a load balancing service.

Block S530, which includes tunneling a media stream to the remote region, functions to transfer data for persistent storage in the remote region. Tunneling to the remote region is preferably used to update records in the remote region. There may be several ways to accomplish this. A first variation include tunneling of a media stream may include establishing VPN proxies that function to get around firewalls. A firewall for HTTP is preferably opened to enable servers of the local region push media streams to media services of the remote region. As described above, service proxy servers may be implemented within the remote region to receive incoming SSL-encrypted connections from local regions, terminate the SSL, and forward requests to an appropriate media service of the remote region. Another variation may include cutting database dependence of a media service and promoting a resource of the remote region to update the database. Data generated in the media service is preferably streamed from the local region to the remote region. In one variation, an existing SIP channel may be used as the signaling and media channel for streaming media to the remote region. Special handling of SIP failures or media processing failures may used to ensure updating of the database. Another variation would be to open up firewalls for the databases with records used by a media service. Measures are preferably with the communication link between the regions to avoid a security risk of opening up firewalls for the databases.

Block S540, which includes storing the data of the media service, functions to store the data of the media service in a consistent and accessible manner. The data is preferably stored within a remote region that is used at least in part as a core, central, or main sub-system of the platform. The remote region will preferably be a region where at least part of state data of the platform is kept. There may need to be numerous local regions deployed to service different geographic regions. However, replicating and making the data consistent across each region increases complexity and cost of the platform. A subset of the regions, possibly even one or two regions, is preferably used as the central region where persistent data is stored. The persistent data may be used within logic of the platform or alternatively used as accessible resources available through an API, user interface, or other suitable interface. Once the data from the media service of the local region has completed, the communication-processing server will preferably signal back to the local region over the signaling control channel to stop the recording. Alternatively, a media service in may signal to the communication gateway, which may contact a component of the remote region to indicate that the storing of the persistent data is complete. While storing of persistent data is used for some media services, some media services may not generate persistent data that requires storing outside of the local region.

As shown in FIG. 16, an implementation of the method may include media communication being established within a local region as described above. A call router of a remote region may determine that a call should be recorded. To initiate recording, the call router creates a new recording record in a database, and uses SIP as a control channel to send a SIP INFO signal to a communication gateway in the local region. The SIP INFO preferably includes information of a recording request such as the account name and recording record secure ID. The communication gateway then merges streams of an active call within the first region and pushes the merged media stream over HTTP. A temporary or cached version of the recording may be stored locally. A static proxy component preferably uses the host header and pushes the stream to a service proxy. The service proxy is preferably configured to listen for changes in platform orchestration to determine the load balancing and media resources available.

Client Application Methods

Figure 20:
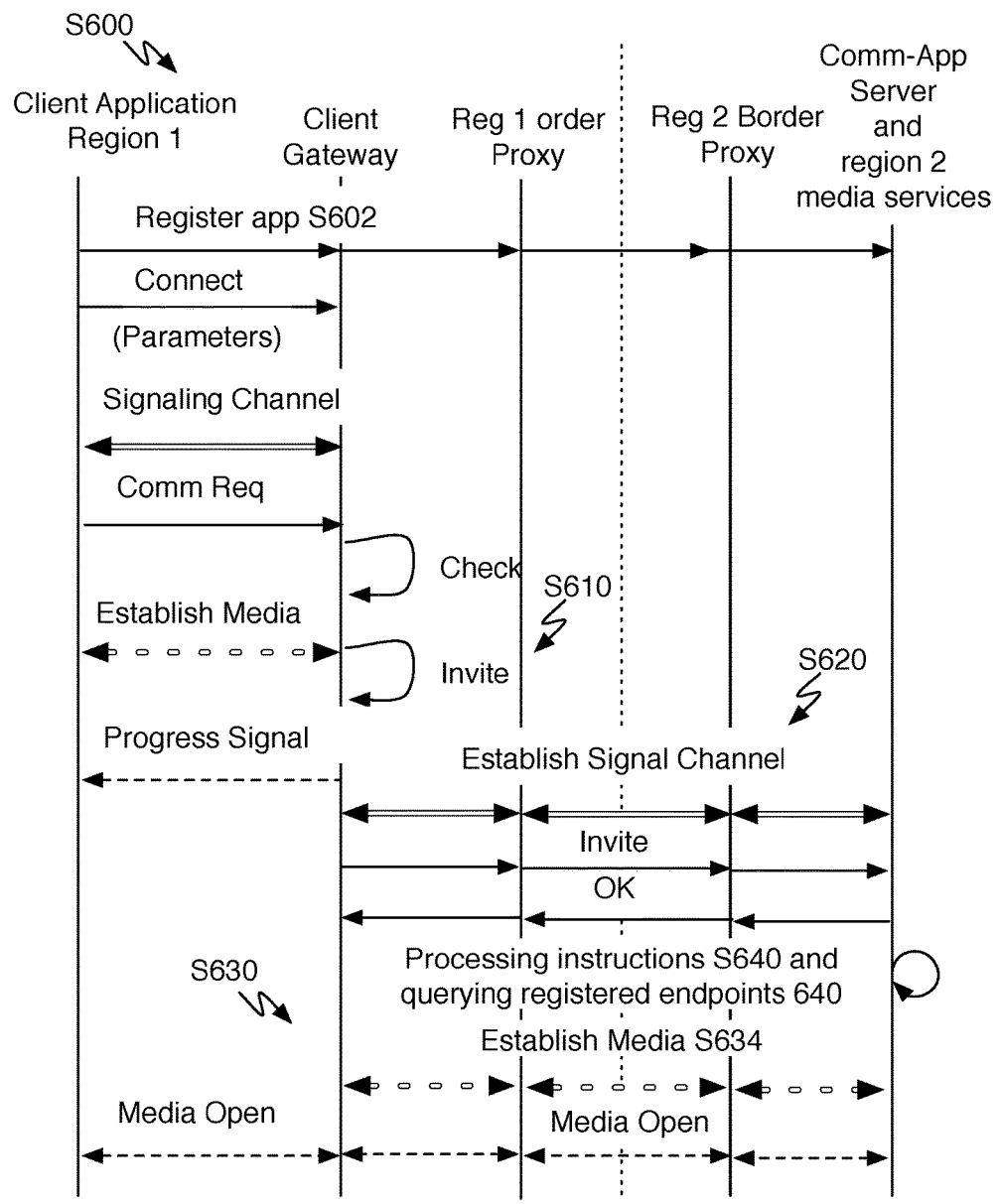
FIGS. 20 and 21 are communication flow diagram representations of a method of for method managing low latency with regional communication involving a client application.
Figure 21:
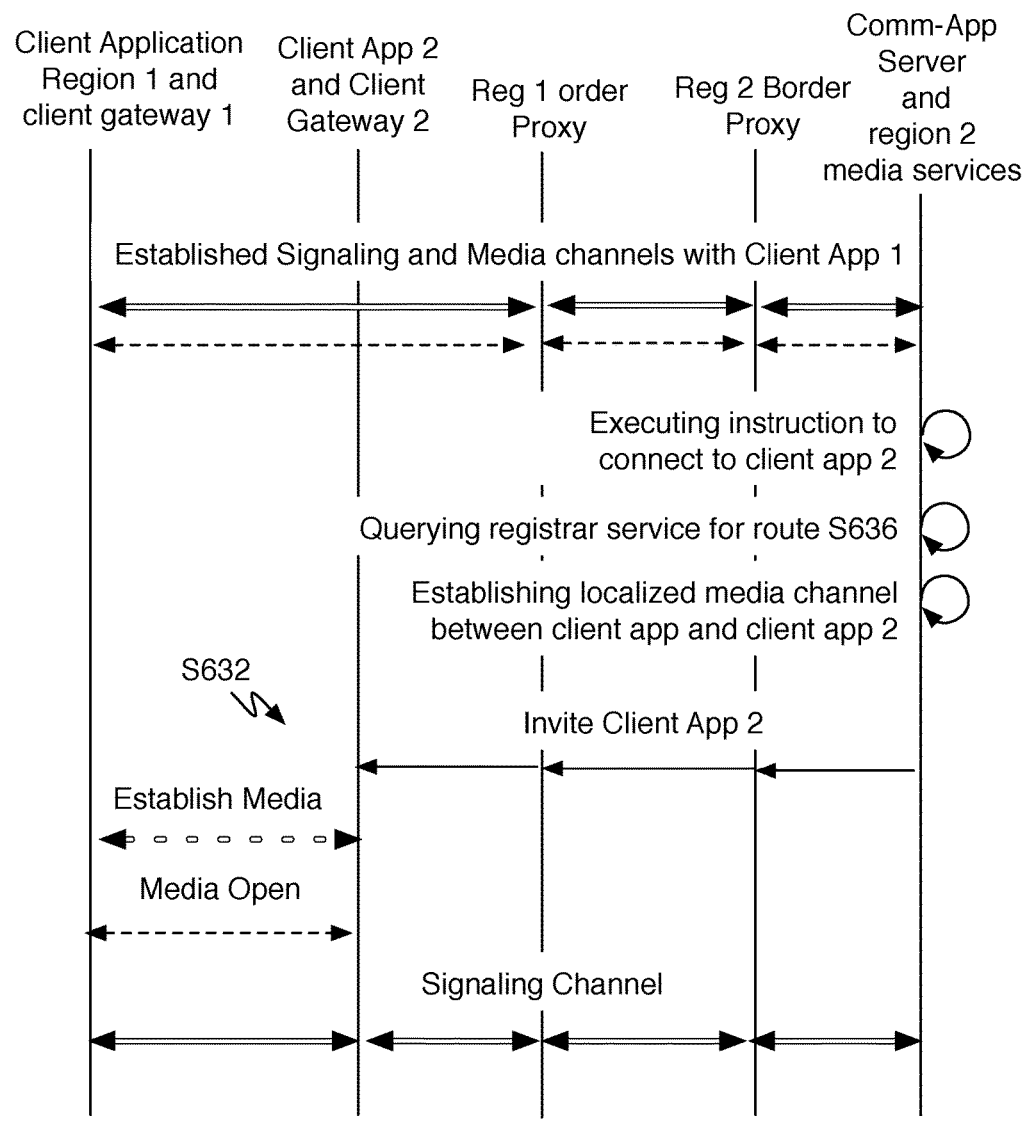

As shown in FIGS. 20 and 21, a method of the preferred embodiment can include registering a set of client application routes S602, receiving a communication invitation of a first endpoint from a client application in a first region S610, processing a set of communication instructions associated with the communication invitation and identifying a set of communication resources S640, querying registered routes of endpoints specified in communication processing instructions S650, dynamically directing signaling and media of the communication according to communication processing instructions and the resources available in at least the first and second regions S630. Dynamically directing signaling and media of the communication can include selectively negotiating or otherwise establishing different routing scenarios. In one variation, S630 can include selectively routing media communication exclusively through communication resources of the first region if media resources to execute the processing instructions are available in the first region S632 and selectively routing media communication through at least the communication-processing server if media resources are not in the first region S634. As the method is preferably applied to client applications, media and optionally signaling can be negotiated to run through a path outside of the platform—to be a substantially peer-to-peer media path (P2P). The method functions to dynamically redirect traffic for signaling and media across multiple regions. In one preferred variation, the method is used within a platform with a communication processing service, wherein the method includes signaling the communication invitation to a communication-processing server in a second region S620. In this variation, the initial state of a communication session may initialize by accessing a communication-processing server of a central region and then appropriately re-negotiate a media path that factors in regional resource availability and requirements. In another variation, the initial state of a communication session starts with resource capacity scoped to the regions of the involved endpoints and then elevates to include other regions if additional communication processing resources are required for a particular communication session. The method is preferably employed in a regionally/globally distributed communication platform that works with communication susceptible to latency performance issues. The method can additionally be applied to handling multiple client application instances, to providing data insight into the client applications participating in the communications, exposing policy to apply targeted control over how media and signaling network topologies are established across different regions.

The method is preferably substantially similar to the one described above. Blocks S620, S630, S632, and S634 can be substantially similar to those described in blocks S220, S230, S232, S234, but method S600 is preferably applied to at least one leg of communication involving a client application. The method can be used for performing low latency routing for a client application communicating with a second client application, with a media service, with a PSTN or other suitable endpoint, or communicating with any suitable endpoint. The method can additionally or alternatively be used with any suitable variations, including the system and method variations described herein. Furthermore, the methods and systems for client communication can include any of the variations of media path variations such as those described in the system and method of U.S. patent application Ser. No. 14/278,993 filed 12 May 2014, which is hereby incorporated in its entirety by this reference.

The method is preferably used to implement communication instruction processing with a communication stream between the first and second region, and when a media communication stream can flow exclusively through the first region, dynamically establishing the communication flow to not flow through intermediary media resources of the second region, but instead to use media resources of the first region. For example, the method is preferably applied when a client application calls a communication application endpoint in a first region; the relevant application is processed; and the communication application connects the calling client application to a second client application while localizing media flow within the region of the first and second client applications. The method is preferably implemented through a system that preferably includes client gateways and at least one regional border proxies that reside in each supported region and a communication-processing server, a registrar proxy, and a location registrar service.

Block S602, which includes registering client application endpoint routes, functions to create a record of client application locations. A client application endpoint route is preferably registered when a client application associated with a particular endpoint comes online (e.g., becomes active on the communication platform), when the client application changes location/routes, or needs to update route information. The set of client application endpoint routes can include registering at least one instance of a client gateway route for a registered endpoint within the platform. The set of client application endpoint routes can include registration of multiple edge resources (e.g., client gateways) distributed across multiple regions. In the scenario where one endpoint will communication with a second endpoint, the method includes at least registering first and second client gateway route of a first and second endpoint. The first and second client gateway routes can be in the same or different regions. A client application in a first region will preferably establish a media and signaling connection with a client gateway of a local region. DNS or other mechanisms can be employed to direct a client application to an appropriate client gateway. The client application may connect to the client gateway through a load balancer.

The client gateway can then use a system-wide signaling protocol such as SIP to negotiate communication at the appropriate time. The client gateway will preferably communicate with a regional border proxy in interacting with platform resources outside of the local region. The regional border proxy uses internal configuration to communicate with a regional border proxy of a main region. The route information to access the client application can then be stored in the main region. A location registrar service preferably facilitates receiving route information and recording/registering the client application route. The location registrar service is preferably hosted or operable within a main region. The main region is preferably a region that includes a communication-processing server. The communication-processing server preferably maintains state of execution of a communication application, and can be more expensive (from an operational cost, infrastructure complexity, and/or feasibility perspective) to duplicate in every region. Registering the client application route in a centralized location registrar service allows active client applications managed in various infrastructure regions to be integrated into a global communication platform. Route information additionally includes a client destination endpoint identifier that can be used to query and identify the client application as an endpoint.

Client applications in different regions preferably register routes, such that for any valid endpoint identifier a route can be provided. Additionally, the location registrar can maintain the state of endpoints. State of an endpoint can include, active, offline, idle/away, or any suitable status. Additionally, a client application endpoint can be registered for multiple instances. The method will include registering multiple instances of client application endpoint routes for an endpoint. The different instances can be registered with different route information. For example, a user can activate a native application on a mobile device at the same time the user has the same account activated on a browser of a different computing device. When multiple instances are registered dynamically directing signaling and media of the communication S630 can include selecting a client application endpoint instance of the second endpoint according to an instance prioritization policy, which functions to select an appropriate instance for use with a given communication. The instance prioritization policy can depend on prioritizing media path performance (e.g., minimizing latency, increasing call quality, minimizing call cost, etc.), prioritizing user preference of a client application instance (e.g., user history of instance activity, defined rules of where to call first, etc.), or other suitable ways of differentiating between multiple instances. For example, a call directed at the client application endpoint can initiate parallel calls to both instances and the first one to respond gets connected. Similarly, a presence server can be used to dynamically select a preferred instance to receive a call inbound to the endpoint. While the method describes a process to connect a first client application in a first region with a second client application also in the first region, the approach of the method can be generalized to apply to connecting client applications or any type of endpoint in the same or different region.

Block S610, which includes receiving a communication invitation of a first endpoint from a client application in a first region, functions to have a client application initialize a call or communication session. The client application preferably uses a real-time communication protocol to establish signaling and media channels through a client gateway. The client gateway is preferably a local client gateway in the same region as the device of the client application. Route optimizing DNS can be employed or leveraged to select an appropriate client gateway.

In a first variation of a first region, receiving a communication invitation of a client application in a first region can include receiving a connection request from a first client application, verifying at least one parameter of the communication request, merging the real time communication of the client with real time communication of a communication destination (e.g., the communication-processing server). Establishing a connecting between the client application and the gateway is preferably substantially similar to the client described in U.S. patent application Ser. No. 14/054,254, filed 15 Oct. 2013, which is hereby incorporated in its entirety by this reference.

In a second variation of a main region, the communication invitation of the first endpoint is received at the communication-processing server. The communication invitation can include registered route information from the client application in a first region. The communication invitation is preferably received through the regional border proxy of the main region.

Block S640, which includes processing a set of communication instructions associated with the communication invitation and identifying a set of communication resources, functions to process how the communication invitation should be processed. In one preferred variation, the processing of communication instructions is performed at the communication-processing server upon the signaling the communication invitation to the communication-processing server S620. A preferred scenario would have the first client gateway of the first endpoint in a region that is distinct from the region of the communication-processing server—the signaling at least has to initially span to at least a second region. In another variation, the communication invitation may include data that conveys communication instructions. For example, the communication invitation may specify a client endpoint to connect to. Processing a set of communication instructions is preferably mapped to at least a subset of the communication-processing resources. The subset of communication-processing resources includes signaling and/or media resources requested to act on the communication session. The communication-processing resources can include a communication application processor, a media recording service, a transcoding service, a text-to-speech service, a transcription service or any suitable service, and/or any suitable type of communication processing service.

Block S650, which includes querying registered routes of endpoints specified in communication processing instructions, functions to determine a location of a specified destination endpoint. A registrar proxy server is preferably operated within the main region where the communication-processing server is located. The registrar proxy server communicates an identifier of the intended destination communication endpoint. The identifier is preferably a name or number that is used to address or specify the intended communication destination. The identifier can be used to access an associated route if an instance of a client application is active for that identifier. As mentioned before, multiple instances of a client application can be simultaneously active. Multiple routes can be selected. Alternatively a route or routes can be selected according to a suitable heuristic such as application instance prioritization, user preference, location, usage history, presence information, or any suitable type of heuristic. Querying registered routes preferably resolves by identifying at least one regional route of a second endpoint. The second endpoint is preferably a communication destination to which the first endpoint will be connected. The route is preferably used in block S632 to establish a media channel between the original communication endpoint and the destination communication endpoint. The media channel preferably short circuits use of extraneous resources, such as a communication-processing server, which can result in a media channel passing through the main region when not required.

Block S630, which includes dynamically directing signaling and media of the communication according to the regional availability of the communication resources, the client application route of the first endpoint, and the client gateway route of the second endpoint, functions to interpret the communication processing instructions into negotiated signaling and media to appropriately use the resources available in at least regions of the platform. In block S620, an application is preferably processed and executed for the connected client application. Instructions of the application can direct various actions. One type of action is performing media-related action between a service of the platform and the connected endpoint (e.g., a caller connected to an automated phone service). Other types of actions can connect at least two communication endpoints. When an instruction depends on the platform providing a media service, the signaling and media is routed appropriately between regions to provide the media service. For example, TTS instructions can be executed that direct execution of a media action facilitated from a service. In such a state, the media channel can be routed through the first region and a TTS media service in the main region. Signaling and media communication can alternatively be routed in any suitable manner depending on the availability of media services in a region. When an application instruction directs connecting a communication endpoint with a second communication endpoint, the signaling and media channels are directed to take a preferred path through the regions.

Figure 23A:
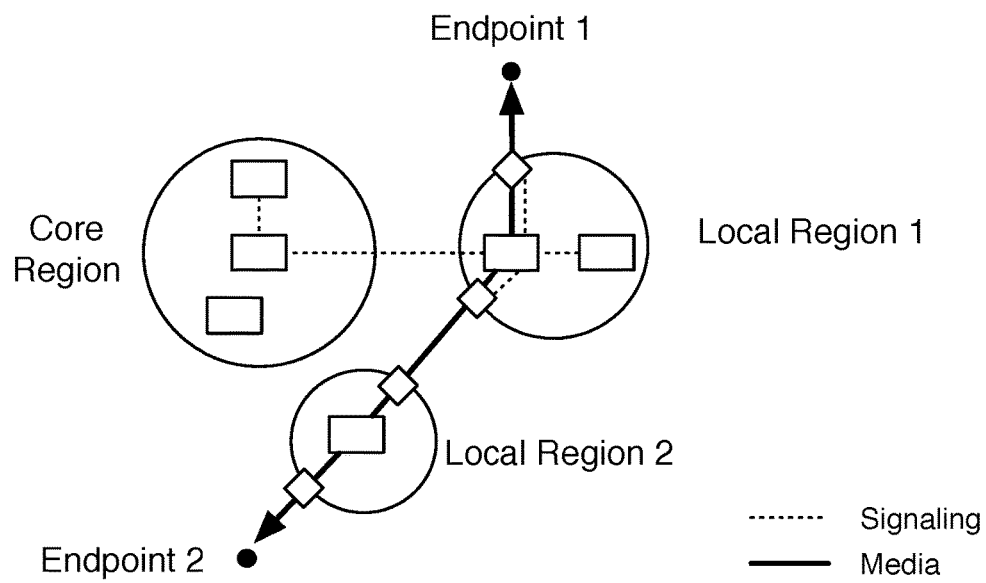
FIGS. 23A and 23B are schematic representations of exemplary distinct media and signaling topologies.
Figure 23B:
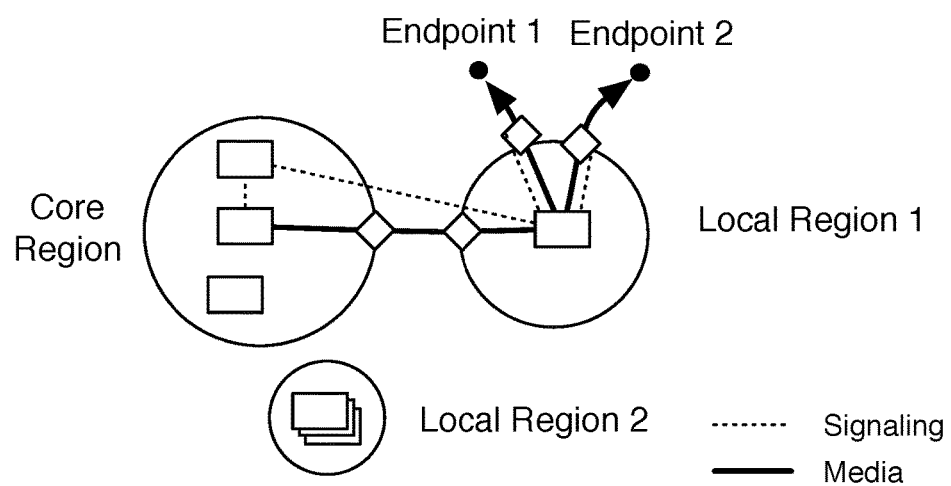

Block S630 can result in various signaling and media routing scenarios. The selected scenario preferably depends on required and/or requested communication resources (e.g., media resources and/or signaling resources) and the region location of the client gateway instances to be used for involved endpoints. The signaling can be setup with a topology that differs from the media as shown in FIGS. 23A and 23B. The media path can have a greater impact on user experience, and in one variation only the media path is considered in the dynamic directing. At least three different modes of media routing can be achieved which can include different variations and sub-combinations. The set of communication-processing resources will preferably include a non-empty set of media-processing resources that operate as intermediary nodes in a media path of the communication. Block S630 will negotiate a media path that satisfies a routing policy for a media topology that includes the client application of the first endpoint, the client application of the second endpoint, and at least the media-processing resources. In one variation, the negotiated media path will preferably satisfy a routing policy for a media topology that minimizes number of regions. In another variation, it is the latency, media stream quality, internal cost of streaming media, customer cost of streaming media, or any suitable metric or metrics that can be used in selecting a path. In one variation, a routing policy can be customized and set as described below.

Figure 22A:
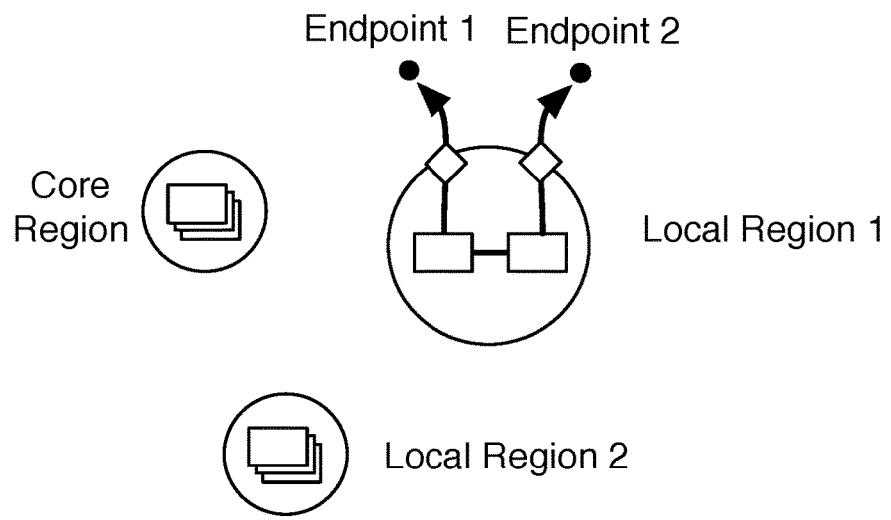
FIGS. 22A-22J are schematic representations of exemplary media topologies.
Figure 22B:
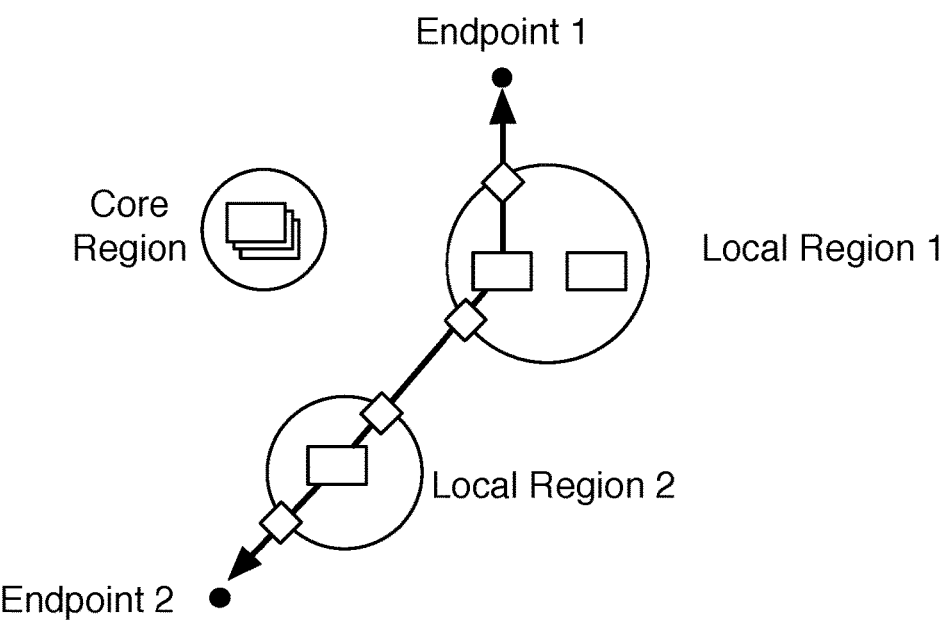
Figure 22C:
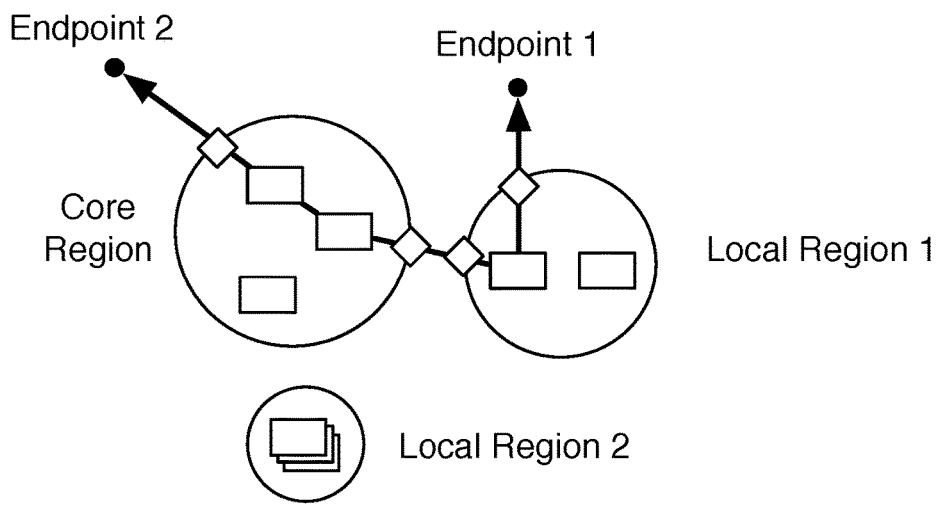
Figure 22D:
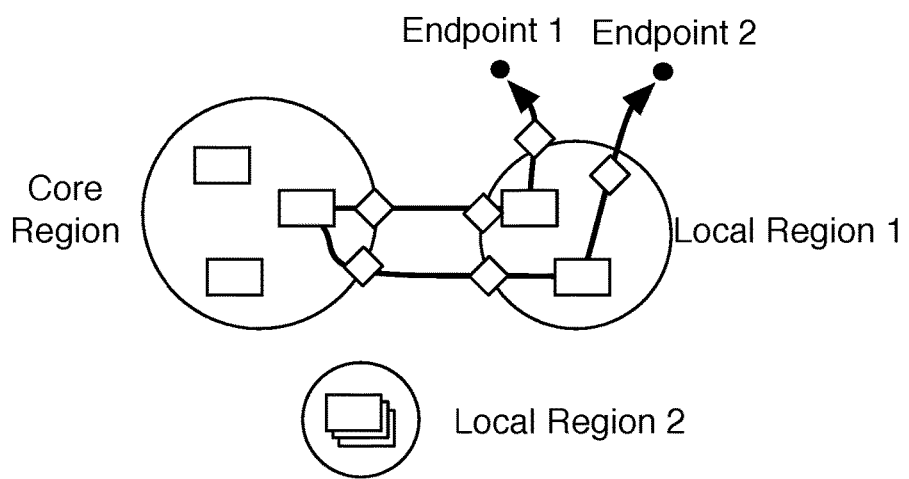
Figure 22E:
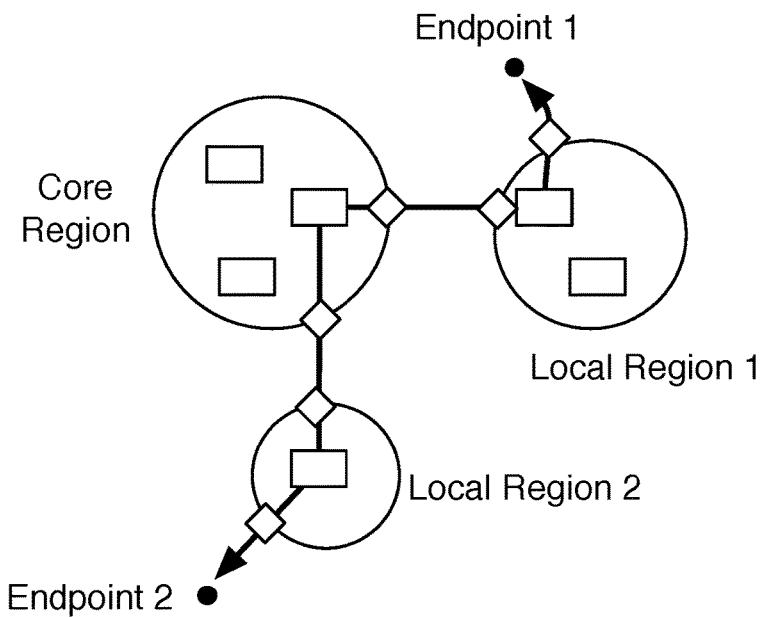
Figure 22F:
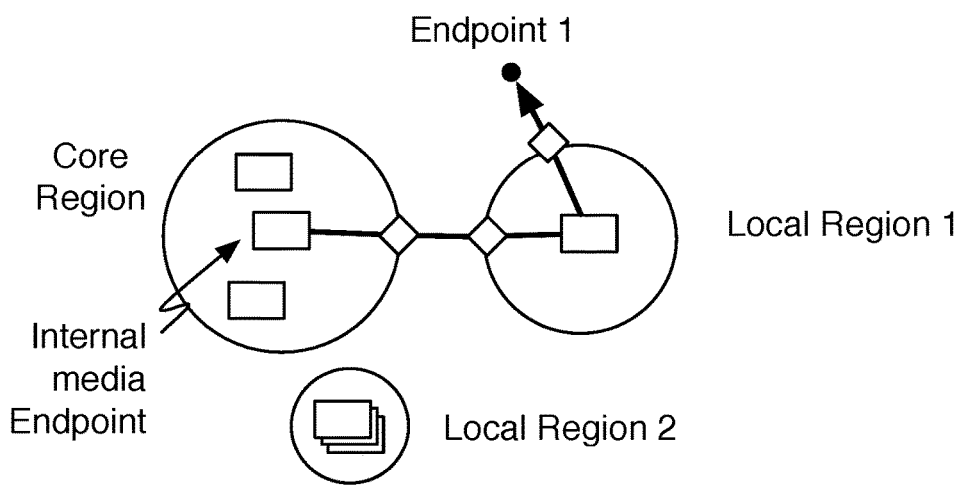
Figure 22G:
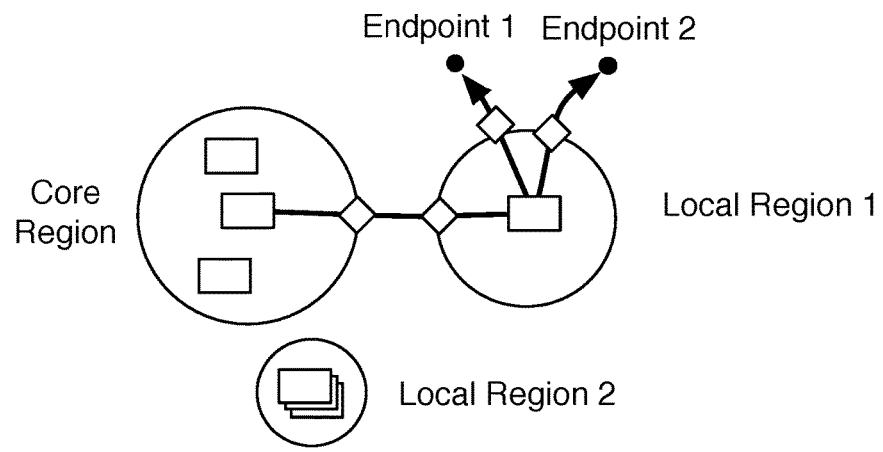
Figure 22H:
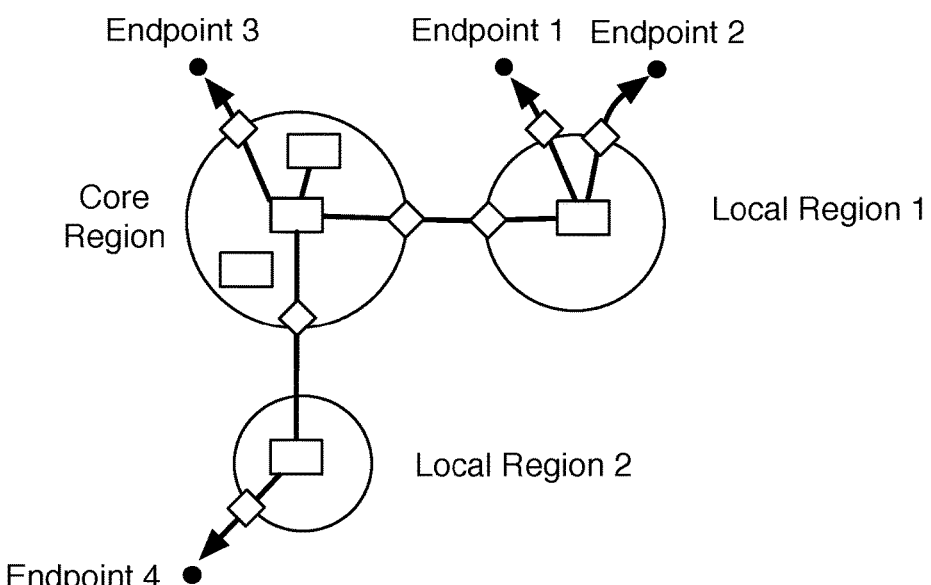
Figure 22I:
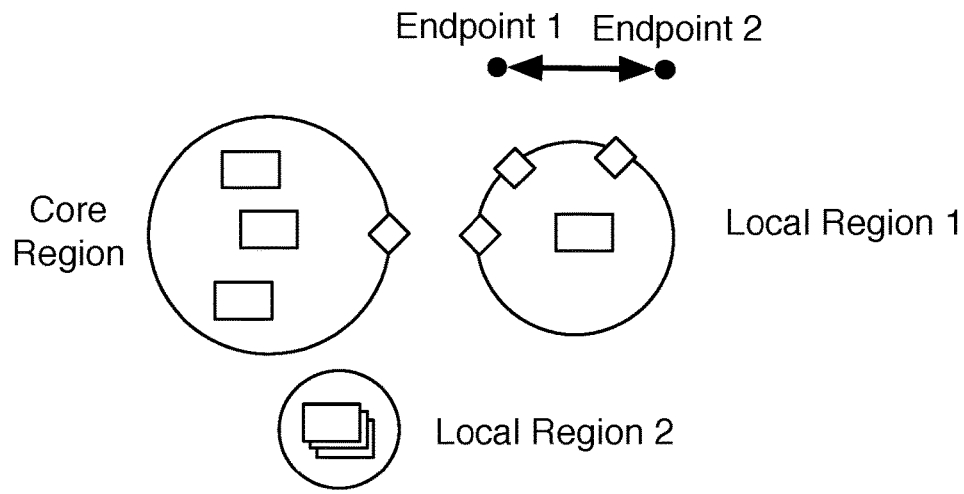
Figure 22J:
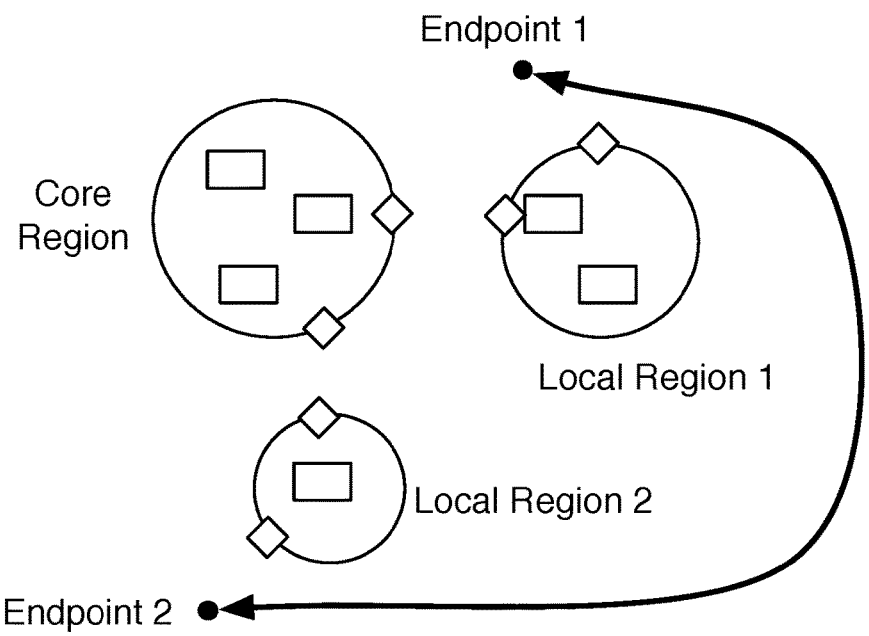
Figure 24:
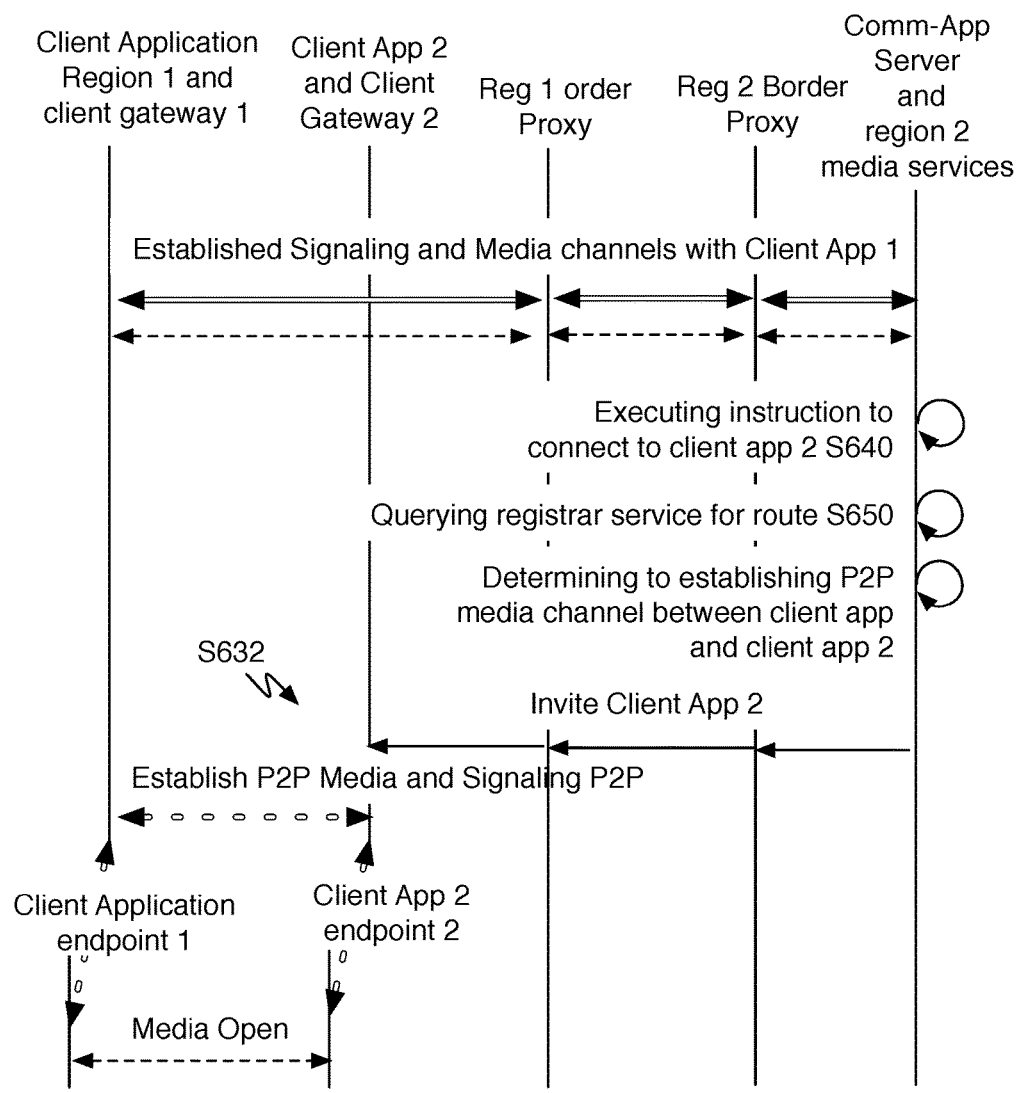
FIG. 24 is a communication flow diagram representation of a variation of the method negotiating a peer-to-peer media stream.

A first mode of signaling and media direction can be multi-regional routing, where media spans multiple regions to access communication processing resources and/or client gateway instances. In a first variation, the multi-regional routing is used to access communication processing resources not available in a region of an involved endpoint. In particular, in a communication application platform one type of communication-processing server may be exclusive to a central region (or regions), and block S630 can include routing media communication through at least the communication-processing server if media resources are not in the first region S634 as shown in the exemplary media topologies of FIGS. 22C, 22D, 22E. In another variation, the endpoints may be in different regions, and in yet another variation, a communication-processing server may be in a region other than a central region but also not in the region of an involved client gateway instance such as in the exemplary topology shown in FIG. 22B. A second mode of signaling and media direction can be a local routing, wherein media is kept within a single region and short circuits a path through other regions as shown in the exemplary media topologies of FIG. 22A. More specifically, a local routing mode can include routing media communication exclusively through communication resources of the first region when the set of communications resources to execute the communication instructions are available in the first region S632. A local routing mode preferably depends on the involved endpoints of a communication to be connected through a client gateway instance in the same region (what resources are mapped to the instructions for the communication session, and then the signaling and media is routed appropriately between regions to integrate the communication-processing resources into the media path. For example, the regional route of the destination endpoint is in the first region of the calling endpoint. In yet a third mode, dynamically directing signaling and media of the communication can include establishing P2P connection, which can be an option when both the client application endpoints are in a networking context that allows P2P media paths, and where there are no communication-processing resources required from the platform as shown in FIGS. 22I and 22J. In one variation, a communication-processing resource may be delegated to one of the client applications. This P2P mode can include negotiating a peer-to-peer media path between the first endpoint and the second endpoint as shown in FIG. 24. Other suitable media topologies can additionally be established such as branches to outside resources as shown in exemplary media topologies of FIGS. 22F and 22G. Additionally, an arbitrary number of endpoints can be handled wherein different branches of each media path can be selected independently or as a whole as shown in the exemplary media topology of FIG. 22H.

Block S632, which includes selectively routing media communication exclusively through communication resources of the first region when media resources to execute the processing instructions are available in the first region, functions to isolate media channel communication to relevant regions. The destination communication endpoint can be in any suitable region relative to the original communication endpoint. A general approach, selectively routing media communication exclusively through communication resources of the first region includes establishing, inviting, or re-inviting the original communication endpoint to communicate with the destination communication endpoint through a media channel that passes between the application original client application, a first client gateway, a second client gateway and the destination communication. In a first exemplary scenario, the original client application and the destination communication endpoint are both in the first region. In a second exemplary scenario, the original client application is in the first region, the destination endpoint is in a second region, and the first region and the second region are different from the main region with the communication-processing server. In the first and second exemplary scenarios, the media signaling can short circuit, hop or otherwise avoid routing through the main region. In a third exemplary scenario, the destination communication endpoint is in the main region. In such an exemplary scenario, the media channel can route through the communication-processing server or alternatively route around the communication-processing server.

The registrar proxy can facilitate establishing the media channel. The registrar can use the queried route to invite the destination communication endpoint. The signaling channel is preferably maintained with the communication-processing server after the media channel is routed for regional low latency. The signaling channel can enable API initiated actions established at the platform to be acted on by the communication-processing server. For example, if a call is established between two client applications in the first region and an outside entity makes an API call to redirect the caller to another destination during the call, the signaling channel can be used to tear down the established media channel and establish a new media channel in a substantially a similar manner.

Figure 25:
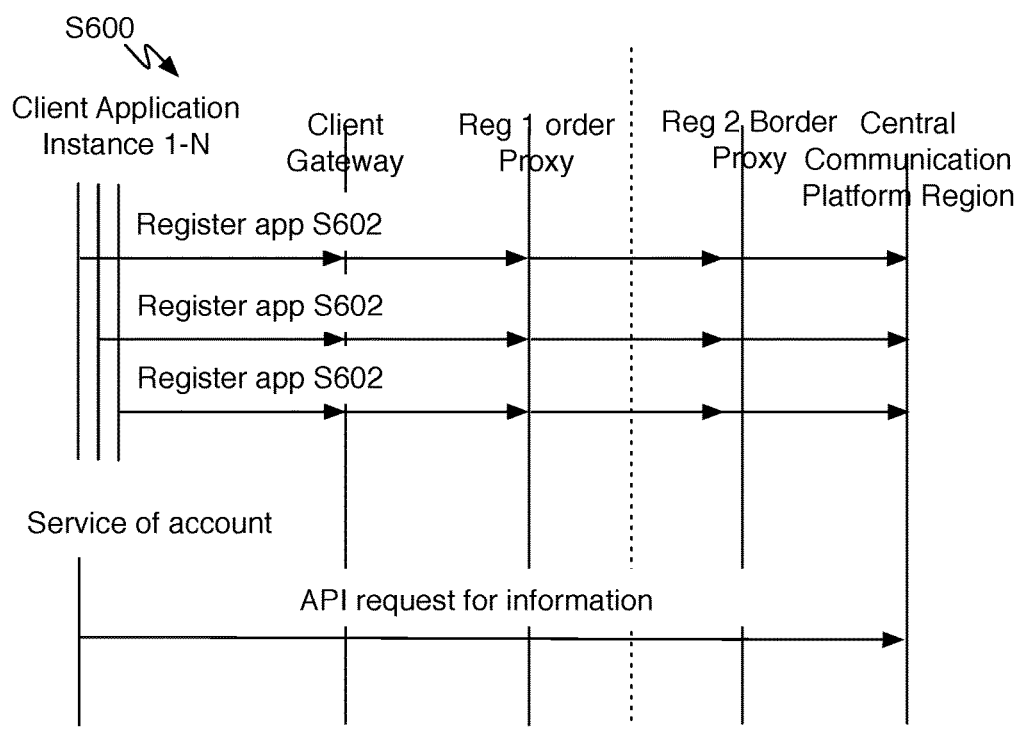
FIG. 25 is a communication flow diagram representation of a variation of the method logging and providing data analytics of client application information.

Additionally the method can include registering a set of client application endpoint routes further comprises logging client application information S660, which functions to collect data through which the state of client application status and history can be understood and used in augmenting operation as shown in FIG. 25. Logging client application information preferably collects additional meta-data about each connected instance. The meta-data can include device type, client application type, regional association, media stream type, media bandwidth capabilities, device capabilities, actual/approximate geographic location, network location information (e.g., IP address), and/or any suitable type of information. As a client application may change networks as a user moves, the history of changes for a client application instance can additionally be logged. The logged information can be stored in a raw format or may be processed into more a higher level data model. AS described above the client applications of an endpoint preferably communicate media over an internet protocol, but the set of client applications and devices may vary greatly. Some client application endpoints may be running through a web browser client; some may be native applications, some may be on mobile devices, and some may be hosted on a dedicated computer. The type of media can additionally vary, wherein the set of different media types can include audio, video, multimedia, and/or any suitable type of real-time stream.

The logged client application information can be used in a variety of ways. In one variation, the information is used internally for data analytics and/or setting new routing policies. In another variation, a subset or all of the information can be exposed to appropriate accounts. Client application information and associated communication sessions can be exposed through an application programming interface (API). In another variation, a user interface/dashboard can be used in communicating data concerning the client application information. The amount of data is preferably scoped to only data of one particular account or subaccount. However, global data from across the platform may be exposed in some manner.

Figure 26:
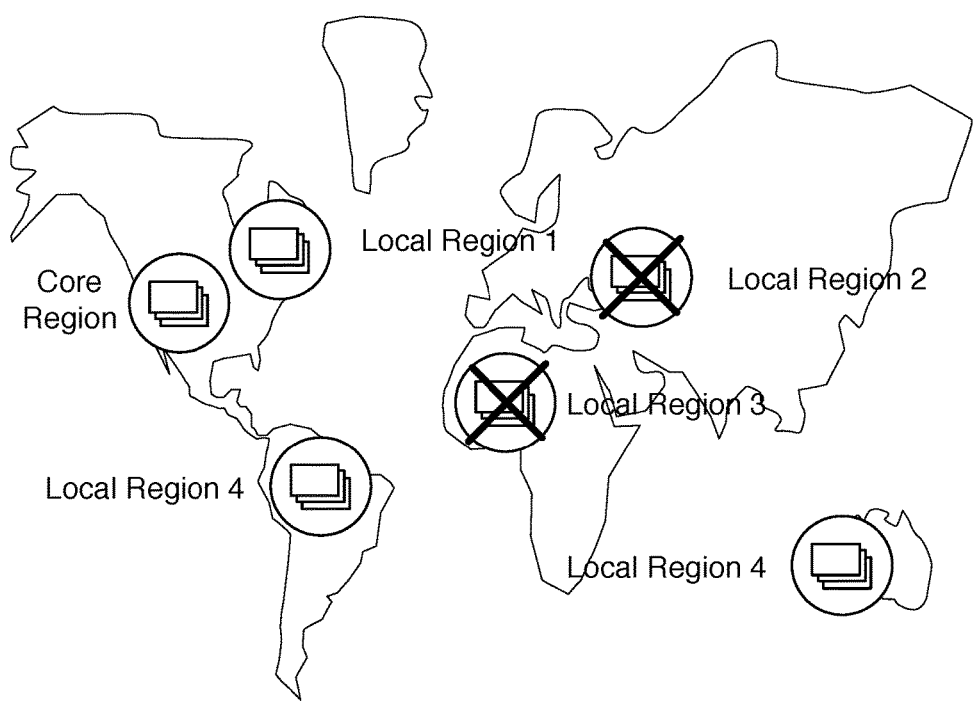
FIG. 26 is a schematic representation of a routing policy of an account.

As mentioned above, another variation of the method can include setting a routing policy of at least one account in the platform. In this variation dynamically directing signaling and media can include applying the routing policy of the account on routing to communication endpoints and media resources. Routing policies may set what metrics are prioritized when selecting regional media topology. More specifically, routing policies includes rules defining regional resource preference as shown in FIG. 26. A routing policy can be set per account, per sub-account, per endpoint, per region (e.g., for calls made from a region or for being terminated in a region), for time of day, or for any suitable subset of communication. In another variation, particular regions can be prohibited, prioritized, or otherwise weighted. For example, a routing policy of one account may prevent resources of one region from being used, which forces media to not pass through that region. In another example, an account may set all media to exclusively route media through one of a subset of the available regions.

As a person skilled in the art will recognize from the previous detailed description and from the figures and claims, modifications and changes can be made to the preferred embodiments of the invention without departing from the scope of this invention defined in the following claims.

What is claimed is:
1. A method comprising:
   a registrar system of a hardware system storing first registration information associating a first client gateway device of a first geographic region and a second client gateway device of a second geographic region with a first communication endpoint of a first client device;

the registrar system storing second registration information associating a third client gateway device with a second communication endpoint, wherein the third client gateway device is a gateway of the first geographic region;
a communication processing server of the hardware system receiving a first communication invitation for the first communication endpoint from a second client device of the second communication endpoint via the third client gateway device;
responsive to the first communication invitation provided by the second client device, the communication processing server accessing the first registration information from the registrar system and selecting one of the registered first client gateway device and the registered second client gateway device according to at least one of user preference, geographic location and usage history information;
responsive to selection of the first client gateway device: the communication processing server negotiating a first peer-to-peer media path between the second client device and the first client device via the first client gateway device and the third client gateway device, the first client gateway device providing media communication of the first peer-to-peer media path to the third client gateway device, and the third client gateway device providing media communication of the first peer-to-peer media path to the first client gateway device, and
responsive to selection of the second client gateway device: the communication processing server negotiating a second peer-to-peer media path between the second client device and the first client device via the second client gateway device and the third client gateway device, the second client gateway device providing media communication of the second peer-to-peer media path to the third client gateway device, and the third client gateway device providing media communication of the first peer-to-peer media path to the second client gateway device,
wherein the first client gateway device is a real-time communication gateway device,
wherein the second client gateway device is a real-time communication gateway device, and
wherein the third client gateway device is a real-time communication gateway device, and
wherein the first geographic region is different from the second geographic region.

2. The method of claim 1, wherein the first client device is constructed to communicate with the first client gateway device and the second client gateway device by using application based communication.

3. The method of claim 2, wherein the second client device is constructed to communicate with the third client gateway device by using application based communication.

4. The method of claim 1, wherein the second client device and the first client device are external to the hardware system.

5. The method of claim 1, wherein the communication processing server identifies the first client gateway device and the second client gateway device registered for the first communication endpoint.

6. The method of claim 1, wherein the communication processing server processes a set of communication instructions associated with the first communication invitation, and identifies a set of communication resources of the hardware system and at least the first communication endpoint.

7. The method of claim 6, wherein the communication processing server dynamically directs a signaling path and a media path of a communication of the first communication invitation according to regional availability of the communication resources, the first client gateway device, the second client gateway device, and the third client gateway device.

8. The method of claim 1, wherein the communication processing server selects one of the first client gateway device and the second client gateway device according to geographic location, and the communication processing server selects the first client gateway device having the same geographic region as a third client gateway device registered for the second communication endpoint, wherein the third client gateway device is a gateway device of the first geographic region.

9. The method of claim 1, wherein the communication processing server dynamically updates selection of the client gateway device of the first communication endpoint according to a change in at least one of user preference, location, usage history and presence information, and responsive to the change of selection, the communication processing server negotiates a third peer-to-peer media path between the second client device and the first client device via the third client gateway device and one of the first client gateway device and the second client gateway device based on the updated selection.

10. The method of claim 9,
wherein the first client gateway device, the second client gateway device and the third client gateway device are constructed to provide real-time media communication over an internet protocol, and
wherein the media communication includes one of audio media stream communication and video media stream communication.

11. The method of claim 10, wherein the communication processing server selects one of the first client gateway device and the second client gateway device according geographic location of the first client gateway device and geographic location of the second client gateway device.

12. The method of claim 1,
wherein the first client gateway device is a real-time audio communication gateway device that is constructed to provide real-time audio communication between at least the first client device and the second client device via a public network,
wherein the second client gateway device is a real-time audio communication gateway device that is constructed to provide real-time audio communication between at least the first client device and the second client device via a public network, and
wherein the third client gateway device is a real-time audio communication gateway device that is constructed to provide real-time audio communication between at least the first client device and the second client device via a public network.

13. The method of claim 1,
wherein the first client gateway device is a real-time video communication gateway device that is constructed to provide real-time video communication between at least the first client device and the second client device via a public network,
wherein the second client gateway device is a real-time video communication gateway device that is constructed to provide real-time video communication between at least the first client device and the second client device via a public network, and wherein the third client gateway device is a real-time video communication gateway device that is constructed to provide real-time video communication between at least the first client device and the second client device via a public network.

14. A hardware system comprising:
a first client gateway device of a first geographic region;
a second client gateway device of a second geographic region;
a registrar system constructed to:
   store first registration information associating a first client gateway device of a first geographic region and a second client gateway device of a second geographic region with a first communication endpoint of a first client device, and
   store second registration information associating a third client gateway device with a second communication endpoint, wherein the third client gateway device is a gateway of the first geographic region; and
a communication processing server constructed to:
   receive a first communication invitation for the first communication endpoint from a second client device of the second communication endpoint via the third client gateway device;
   responsive to the first communication invitation provided by the second client device, access the first registration information from the registrar system and select one of the registered first client gateway device and the registered second client gateway device according to at least one of user preference, geographic location and usage history information;
   responsive to selection of the first client gateway device: negotiate a first peer-to-peer media path between the second client device and first client device via the first client gateway device and the second client gateway device, the first client gateway device providing media communication of the first peer-to-peer media path to the third client gateway device, and the third client gateway device providing media communication of the first peer-to-peer media path to the first client gateway device,
   responsive to selection of the second client gateway device: negotiate a second peer-to-peer media path between the second client device and the first client device via the second client gateway device and the third client gateway device, the second client gateway device providing media communication of the second peer-to-peer media path to the third client gateway device, and the third client gateway device providing media communication of the first peer-to-peer media path to the second client gateway device,
   wherein the first client gateway device is a real-time communication gateway device,
   wherein the second client gateway device is a real-time communication gateway device, and
   wherein the third client gateway device is a real-time communication gateway device,
   wherein the first geographic region is different from the second geographic region.

15. The system of claim 14, wherein the second client device and the first client device are external to the hardware system.

16. The system of claim 14, wherein the communication processing server is constructed to dynamically update selection of the client gateway device of the first communication endpoint according to a change in at least one of user preference, location, usage history and presence information, and responsive to the change of selection, the communication processing server is constructed to negotiate a third peer to peer media path between the second client device and the first client device via the third client gateway device and one of the first client gateway device and the second client gateway device based on the updated selection.

17. The system of claim 14,
   wherein the first client gateway device, the second client gateway device and the third client gateway device are constructed to provide real-time media communication over an internet protocol, and
   wherein the media communication includes one of audio media stream communication and video media stream communication.

18. The system of claim 17, wherein the communication processing server is constructed to select one of the first client gateway device and the second client gateway device according geographic location of the first client gateway device and geographic location of the second client gateway device.

* * * * *

UNITED STATES PATENT AND TRADEMARK OFFICE
CERTIFICATE OF CORRECTION

PATENT NO. : 10,063,461 B2
APPLICATION NO. : 15/376087
DATED : August 28, 2018
INVENTOR(S) : Tarricone et al.

Page 1 of 1

It is certified that error appears in the above-identified patent and that said Letters Patent is hereby corrected as shown below:

In the Claims

Column 34, Line 25, in Claim 16, delete "peer to peer" and insert --peer-to-peer-- therefor Signed and Sealed this
Second Day of July, 2019

Andrei Iancu
*Director of the United States Patent and Trademark Office*